(12) United States Patent
Yamauchi et al.

(10) Patent No.: US 7,559,675 B2
(45) Date of Patent: Jul. 14, 2009

(54) LIGHT SOURCE DEVICE AND PROJECTOR

(75) Inventors: Kentaro Yamauchi, Matsumoto (JP); Toshiaki Hashizume, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 11/702,071

(22) Filed: Feb. 5, 2007

(65) Prior Publication Data
US 2007/0182301 A1  Aug. 9, 2007

(30) Foreign Application Priority Data
Feb. 7, 2006  (JP) .............................. 2006-029452
Feb. 7, 2006  (JP) .............................. 2006-029453

(51) Int. Cl.
  *F21V 7/20* (2006.01)
(52) U.S. Cl. ........................ 362/261; 362/294; 362/263
(58) Field of Classification Search ................. 362/261, 362/263, 296
  See application file for complete search history.

(56) References Cited

U.S. PATENT DOCUMENTS 7,111,962 B2 *  9/2006  Meguro et al. .............. 362/294

2005/0122721 A1  6/2005  Hori

FOREIGN PATENT DOCUMENTS

| JP | A-2005-099679 | 4/2005 |
| JP | A 2005-148293 | 6/2005 |
| JP | A 2005-173019 | 6/2005 |
| JP | A-2005-317465 | 11/2005 |
| JP | A-2005-347127 | 12/2005 |

* cited by examiner

*Primary Examiner*—Anabel M Ton
(74) *Attorney, Agent, or Firm*—Oliff & Berridge, PLC

(57) ABSTRACT

A light source device, includes: a light source lamp that has a light emitting tube and a pair of electrodes, the light emitting tube including a discharge space; the pair of electrodes being disposed in the discharge space of the light emitting tube; a reflector in a substantially C-shape in cross section that reflects a light beam irradiated from the light source lamp; and an unused-light reflecting member being disposed on a light irradiation front side of the reflector and including an unused-light reflecting surface, the unused-light reflecting surface reflecting unused light irradiated outside the reflector of the light beam irradiated from the light source lamp, the unused-light reflecting surface being an ellipsoidal surface that has a first focal position on a light emission center of the light source lamp and a second focal position onto which the ellipsoidal surface reflects and converges the unused light to be guided to the outside of the light source device.

16 Claims, 13 Drawing Sheets

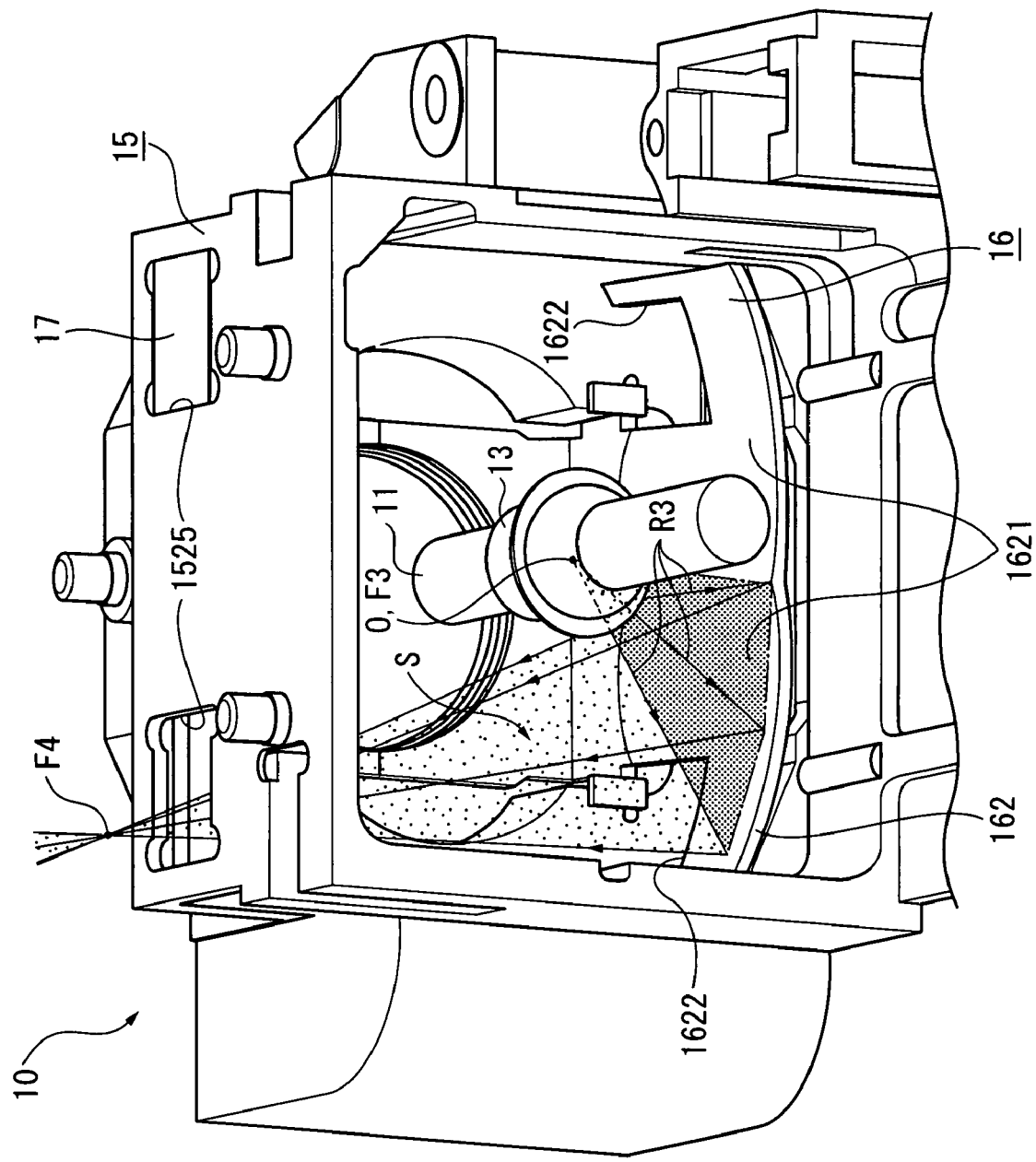

LIGHT SOURCE DEVICE AND PROJECTOR

The entire disclosure of Japanese Patent Applications No. 2006-29452 and 2006-29453, both filed Feb. 7, 2006, is expressly incorporated by reference herein.

BACKGROUND

1. Technical Field

The present invention relates to a light source device and a projector.

2. Related Art

There have been known projectors that modulate a light beam irradiated from a light source in accordance with image information and project an optical image in an enlarged manner.

Light source devices of such projectors often include a light source lamp of electric discharge type such as a metal halide lamp or a high-pressure mercury lamp, a reflector reflecting a light beam irradiated from the light source lamp and a lamp housing accommodating the light source lamp and the reflector (see, for example, JP-A-2005-148293).

In the light source device disclosed in JP-A-2005-148293, a light beam irradiated toward a reflector side out of light beams irradiated from the light source lamp is reflected by the reflector, so that the reflected light can be used for irradiation on to be irradiated object. A light beam irradiated outside the reflector out of the light beams irradiated from the light source lamp cannot be used for irradiation on to be irradiated object. The unusable light is irradiated on the lamp housing and absorbed in an inner wall of the lamp housing to be converted into heat. Hence, the temperature inside the light source device will rise and it becomes difficult to cool the light source device, which hinders realization of a longer operating life of the light source device.

SUMMARY

An advantage of some aspects of the invention is to provide a light source device and a projector which have a long life.

A light source device according to an aspect of the invention includes: a light source lamp having a light emitting tube that includes a discharge space and a pair of electrodes disposed in the discharge space of the light emitting tube; a reflector in a substantially C-shape in cross section that reflects a light beam irradiated from the light source lamp; and an unused-light reflecting member that is disposed on a light irradiation front side of the reflector and includes an unused-light reflecting surface. The unused-light reflecting surface reflects unused light irradiated outside the reflector of the light beam irradiated from the light source lamp. The unused-light reflecting surface is an ellipsoidal surface that has a first focal position on a light emission center of the light source lamp and a second focal position onto which the ellipsoidal surface reflects and converges the unused light to guide the unused light to the outside of the light source device.

The reflector may be either a parabola reflector or an ellipsoidal reflector.

The unused-light reflecting member may be integrally formed on an inner wall of a supporting member (a lamp housing) supporting the reflector and the like. In other words, the inner wall of the supporting member may serve as the unused-light reflecting surface. The unused-light reflecting member may be provided as a separate body from the supporting member.

In the aspect of the invention, since the light source device is provided with the unused-light reflecting member, the unused light irradiated outside the reflector of the light beam irradiated from the light source lamp (the first focal position) is reflected by the unused-light reflecting surface and converged on the second focal position so as to be guided to the outside of the light source device (for example, to the outside of the supporting member (the lamp housing)). Accordingly, unlike the related art, the unused light is not absorbed by the inner wall of the lamp housing or converted to heat, the temperature in the light source device can be maintained low, suppressing deterioration of the lamp housing or the light source lamp and thereby increasing the life of the light source device.

Further, since the unused-light reflecting surface is the ellipsoidal surface, the unused light can be reflected to be converged on the second focal position, so that the unused light can be guided to the outside of the light source device with a simple arrangement.

In the light source device according to the aspect of the invention, the light source lamp and the reflector may be positioned so as not be in a space defined by connecting the second focal position and the unused-light reflecting surface.

In the light source device, when the unused light is reflected by the unused-light reflecting surface and converged on the second focal position and if a portion of the unused light reflected by the unused-light reflecting surfaces is irradiated on the light source lamp or the reflector, such irradiation of the portion of the unused light causes an increase in temperature of the light source lamp or the reflector. Hence, it becomes difficult to maintain the temperature in the light source device low.

In the aspect of the invention, since the unused-light reflecting surface is designed such that the light source lamp and the reflector are not in the space defined by connecting the second focal position and the unused-light reflecting surface, the unused light reflected by the unused-light reflecting surface is not irradiated on the light source lamp or the reflector but converged on the second focal position. Accordingly, the temperature of the light source lamp or the reflector is not raised due to such an irradiation of the portion of the unused light, thereby maintaining the temperature in the light source device low.

In the light source device according to the aspect of the invention, the second focal position of the unused-light reflecting surface may be positioned outside the light source device.

In the aspect of the invention, since the unused-light reflecting surface is positioned such that the second focal position is outside the light source device (for example, outside the supporting member (the lamp housing)), when an absorber which absorbs the unused light and converts the unused light to heat is positioned at the second focal position, the absorber and the supporting member can be disposed with a predetermined distance therebetween. Hence, in such an arrangement, it is possible to prevent or reduce the heat generated by the absorber from being conducted to the supporting member, thereby maintaining the temperature in the light source device low. Further, in the arrangement, the shape of the absorber needs not be large, thereby contributing to downsizing of the absorber.

In the light source device according to the aspect of the invention may further include: a supporting member that is disposed on the light irradiation front side of the reflector and supports the reflector, the supporting member attached with the unused-light reflecting member.

In the aspect of the invention, since the unused-light reflecting member is provided independently from the supporting member, the supporting member can be a simple shape compared with an arrangement in which the unused-light reflecting member is integrally formed on the inner wall of the supporting member (i.e. the inner wall of the supporting member serves as the unused-light reflecting surface), thereby simplifying the manufacturing of the light source device.

In the light source device according to the aspect of the invention, the unused-light reflecting surface may include a plurality of unused-light reflecting surfaces.

In such a light source device, when the unused-light reflecting surface is provided as an independent single component, since the unused-light reflecting surface is the ellipsoidal surface, the unused-light reflecting member needs to be large for reflecting and guiding a large amount of the unused light to the outside of the light source device.

When the unused-light reflecting surface is provided as an independent single component, the unused-light reflecting surface needs to be extremely small to set the light source lamp and the reflector outside the space defined by connecting the second focal position and the unused-light reflecting surface. Hence, a large amount of the unused light cannot be reflected by the unused-light reflecting surface to be guided to the outside of the light source device.

In the aspect of the invention, since the unused-light reflecting surface includes a plurality of unused-light reflecting surfaces, a large amount of the unused light can be reflected by the plurality of unused-light reflecting surfaces to guide the unused light to the outside of the light source device, thereby contributing to downsizing of the unused-light reflecting member. Since the plurality of unused-light reflecting surfaces are provided, the unused light reflected by the plurality of unused-light reflecting surfaces can be converged on the second focal positions without being irradiated on the light source lamp or the reflector, so that a large amount of the unused light can be guided to the outside of the light source device. The unused-light reflecting member can be formed in various shapes, thereby enhancing flexibility in design of the unused-light reflecting member.

In the light source device according to the aspect of the invention may further include: a sub reflecting mirror reflecting a portion of the light beam irradiated from the light source lamp toward the discharge space. A reflecting surface of the sub reflecting mirror is disposed so as to face a reflecting surface of the reflector.

In the aspect of the invention, since the sub reflecting mirror is provided to the light source device, the light beam radiated from the light source lamp toward the opposite side of the reflector can be reflected by the sub reflecting mirror toward the discharge space such that the light beam is reflected again by the reflector. Hence, it is possible to enhance the light use efficiency of the light irradiated from the light source lamp. In addition, since the light beam irradiated from the light source lamp toward the opposite side of the reflector can be reflected toward the discharge space by the sub reflecting mirror, the dimension in the optical axis direction and the opening diameter of the reflector can be smaller compared with an arrangement in which no sub reflecting mirror is provided. Accordingly, the light source device can be downsized.

Note that the sub reflecting mirror may be a cold mirror which transmits infrared and ultraviolet rays to prevent overheating of the sub reflecting mirror caused by the irradiated light beam. In such an arrangement, the unused light of infrared or ultraviolet rays having passed through the sub reflecting mirror is irradiated on the unused-light reflecting surface of the unused-light reflecting member. As stated above, when the sub reflecting mirror is provided, the optical axis direction length and the opening diameter of the reflector need to be small for downsizing the light source device, so that the amount of the unused light passing through the sub reflecting mirror becomes large. Hence, when the sub reflecting mirror is provided to the light source device, the above-described advantages can be obtained more appropriately compared with, for example, an arrangement in which no unused-light reflecting member is provided.

In the light source device according to the aspect of the invention may further include: an absorber that absorbs a light beam guided by the unused-light reflecting member to the outside of the light source device.

In the aspect of the invention, since the light source device is provided with the absorber, the light beam guided by the unused-light reflecting member to the outside of the light source device can be absorbed by the absorber to be converted into heat. Hence, compared with, for example, an arrangement in which no absorber is provided, the unused light is not irradiated on a component outside the light source device, so that an optical apparatus on which the light source device is equipped can be efficiently cooled by locally cooling the absorber.

In the light source device according to the aspect of the invention may further include: a supporting member that is disposed on the light irradiation front side of the reflector and supports the reflector, the supporting member attached with the absorber; a biasing member that biases and fixes the absorber to the supporting member; the biasing member made of a heat conductive material, the biasing member having a biasing portion that biases and fixes the absorber to the supporting member and a heat releasing portion that releases heat conducted from the absorber to the outside.

In the aspect of the invention, the absorber is biased and fixed to the supporting member by the biasing member. The biasing member includes the biasing portion and the heat releasing portion which are made of a heat conductive material. Hence, the heat conducted along a heat conduction path from the absorber via the biasing portion to the heat releasing portion can be released by the heat releasing portion, thereby efficiently cooling the absorber.

A projector according to an aspect of the invention includes: the aforesaid light source device, an optical modulator that modulates a light beam irradiated from the light source device in accordance with image information; and a projection optical device that projects the light beam modulated by the optical modulator in an enlarged manner.

According to an aspect of the invention, the projector is provided with the above-described light source device, so that the projector can also provide the same effects and advantages as the light source device.

BRIEF DESCRIPTION OF THE DRAWINGS

The invention will be described with reference to the accompanying drawings, wherein like numbers reference like elements.

FIG. 12 is an illustration showing trajectories of the light beam reflected by the reflecting portion of the aforesaid exemplary embodiment.

DESCRIPTION OF EXEMPLARY EMBODIMENT(S)

An exemplary embodiment of the invention will be described below with reference to the attached drawings.

Arrangement of Projector

Figure 1:
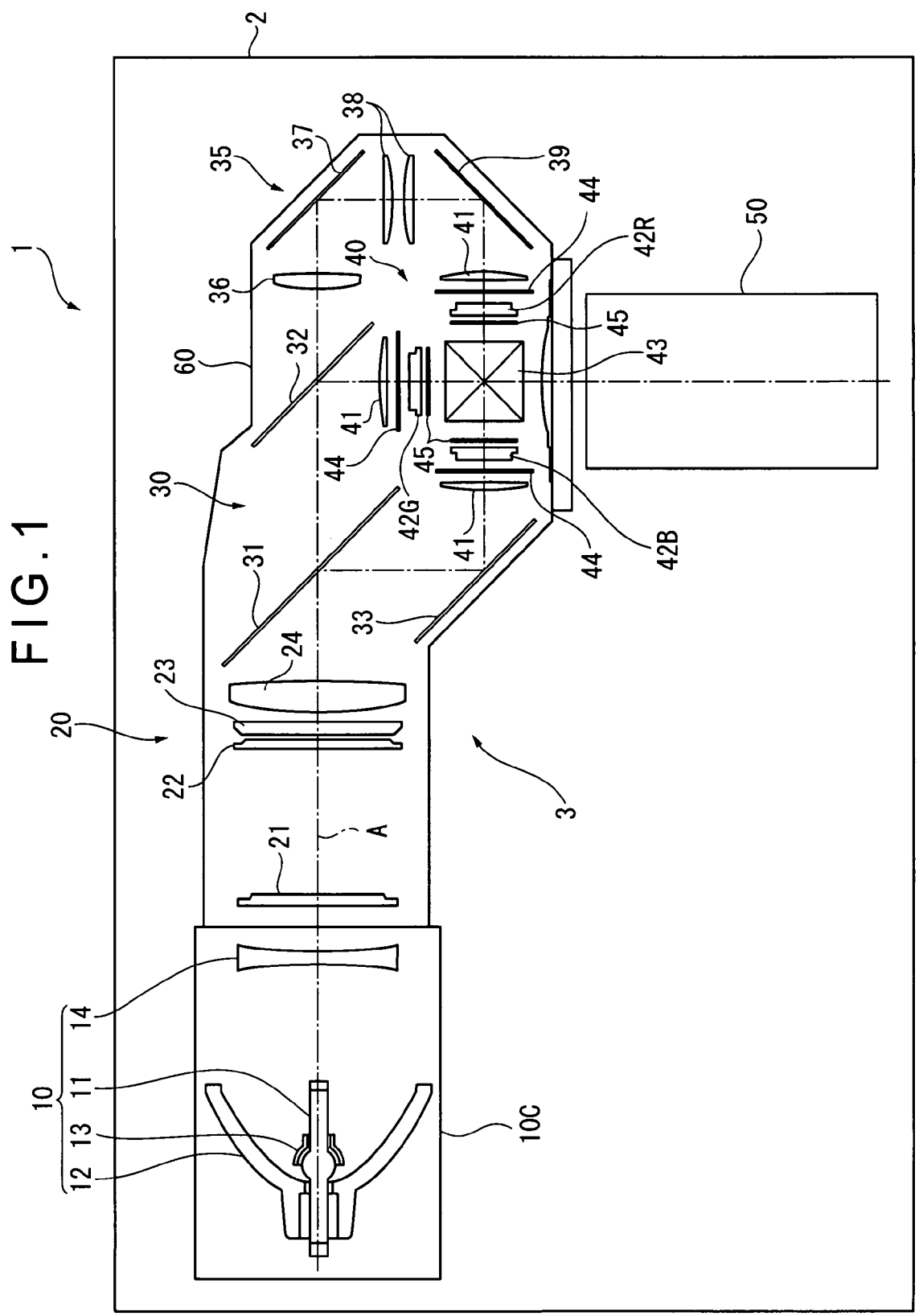
FIG. 1 is a plan view briefly showing a projector of an exemplary embodiment of the invention.

FIG. 1 is a plan view briefly showing a projector 1 of the exemplary embodiment.

The projector 1 is an optical apparatus that modulates a light beam irradiated from a light source in accordance with image information to form image light and projects the formed image light on a projection surface such as a screen in an enlarged manner. As shown in FIG. 1, the projector 1 includes an exterior casing 2 of a substantially rectangular parallelepiped shape and an optical unit 3 accommodated in the exterior casing 2.

Although not shown in the figures, in addition to the optical unit 3, the exterior casing 2 accommodates a power unit supplying electricity from the outside to a component of the projector 1, a cooling unit cooling the inside of the projector 1, a control device controlling the whole projector 1 and the like.

The exterior casing 2 may be made of synthetic resin by injection molding or the like. The exterior casing 2 includes an upper case forming an upper surface, a front surface, a rear surface and lateral surfaces of the projector 1 and a lower case forming a bottom surface, the front surface, the rear surface and the lateral surfaces of the projector 1. The upper case and the lower case are fixed to each other by a screw or the like.

Note that the exterior casing 2 may not be made of synthetic resin. Other materials such as metal may be alternatively used.

The optical unit 3 is accommodated in the exterior casing 2 and forms image light to project in an enlarged manner. As shown in FIG. 1, the optical unit 3 includes a light source device 10, an integrator illuminating optical system 20, a color-separating optical system 30, a relay optical system 35, an optical device 40 and a projection optical system 50 (a projection optical device). These optical elements of the optical systems 20 to 35 and the optical device 40 are accommodated at adjusted positions in an optical component casing 60 in which a predetermined illumination optical axis A is set.

The light source device 10 aligns a light beam irradiated from a light source lamp 11 in a certain direction and irradiates the light beam to illuminate the optical device 40. As shown in FIG. 1, the light source device 10 includes the light source lamp 11, a main reflecting mirror 12 (a reflector), a sub reflecting mirror 13, a parallelizing concave lens 14 and a lamp housing 101B holding these components (see FIGS. 2 to 4), which will be described in detail later. The light source device 10 is accommodated in an outer housing 10C (FIG. 1) which connects with the optical component casing 60. The light source device 10 is accommodated in the outer housing 10C so as to be positioned at a predetermined position relative to the optical component casing 60 (such that a center axis of a light beam irradiated from the light source device 10 is on the illumination optical axis A set in the optical component casing 60).

The light beam irradiated from the light source lamp 11 is: aligned by the main reflecting mirror 12 into a convergent light in an irradiation direction toward a front side of the light source device 10; parallelized by the parallelizing concave lens 14; and irradiated to the integrator illuminating optical system 20.

Note that FIG. 1 shows an arrangement in which the main reflecting mirror 12 is an ellipsoidal reflector. When the main reflecting mirror 12 is a parabola reflector, the parallelizing concave lens 14 is omitted.

The integrator illuminating optical system 20 divides a light beam irradiated from the light source device 10 into a plurality of sub light beams and equalizes in-plane illuminance of an illumination area. The integrator illuminating optical system 20 includes a first lens array 21, a second lens array 22, a polarization converter 23 and a superposing lens 24.

The first lens array 21 functions as a light beam dividing optical element that divides the light beam irradiated from the light source device 10 into a plurality of sub light beams. The first lens array 21 includes a plurality of small lenses aligned in a matrix form in a plane orthogonal to the illumination optical axis A.

The second lens array 22 is an optical element that converges the plurality of sub light beams divided by the above-described lens array 21 and includes a plurality of small lenses aligned in a matrix form in a plane orthogonal to the illumination optical axis A similarly to the first lens array 21.

The polarization converter 23 aligns the sub light beam divided by the first lens array 21 into a linear polarization in a substantially uniform direction.

Although not shown in the figures, the polarization converter 23 includes polarization separating films and reflection films which are alternately arranged with inclination relative to the illumination optical axis A. The polarization separating films transmit one of a P polarized light beam and an S polarized light beam which are contained in each sub light beam and reflect the other. The other reflected polarized light beam is bent by the reflection film and irradiated in the irradiation direction of the one polarized light beam that is a direction along the illumination optical axis A. One of the irradiated polarized light beams is polarized and converted by a phase plate on a light irradiation surface of the polarization converter 23, so that polarization directions of substantially all the polarized light beams are aligned. By using the polarization converter 23, the light beam irradiated from the light source lamp 11 can be aligned into a polarization light beam in a substantially uniform direction, so that the use efficiency of light source light used by the optical device 40 can be enhanced.

The superposing lens 24 is an optical element that converges the plurality of sub light beams having passed through the first lens array 21, the second lens array 22 and the polarization converter 23 in order to superpose the converged light on image formation areas of below-described three liquid crystal panels of the optical device 40.

The color-separating optical system 30 includes two dichroic mirrors 31, 32 and a reflecting mirror 33. With the dichroic mirrors 31, 32, the color-separating optical system 30 separates the plurality of sub light beams irradiated from the integrator illuminating optical system 20 into three colors of color light of red (R), green (G) and blue (B).

The dichroic mirrors 31, 32 are optical elements provided with a wave length selecting film that reflects a light beam in a predetermined wave length range onto a substrate and transmits a light beam in another wave length range. The dichroic mirror 31 disposed on the upstream of an optical path reflects the blue color light and transmits the other color light. The dichroic mirror 32 disposed on the downstream of the optical path reflects the green color light and transmits the red color light.

The relay optical device 35 includes an incident-side lens 36, a relay lens 38 and reflecting mirrors 37, 39. The relay optical device 35 guides the red color light having passed through the dichroic mirrors 31, 32 of the color-separating optical system 30 to the optical device 40. Note that the relay optical device 35 is provided for the optical path of the red color light to prevent a reduction in light use efficiency which may be caused by light dispersion or the like, since the optical path of the red color light is longer than those of the light of the other colors. Although the exemplary embodiment employs the above-described arrangement since the length of the optical path of the red color light is long, it is also possible to elongate the optical path of the blue color light and use the relay optical system 35 for the optical path of the blue color light, for example.

The blue color light separated by the above-described dichroic mirror 31 is bent by the reflecting mirror 33 and supplied to the optical device 40 via a field lens 41. The green color light separated by the dichroic mirror 32 is supplied to the optical device 40 via the field lens 41. The red color light is converged and bent by the lenses 36, 38 and the reflecting mirrors 37, 39 of the relay optical system 35 and supplied to the optical device 40 via the field lens 41. Note that the field lens 41 is disposed on the upstream of the optical path of each color light of the optical device 40 such that each sub light beam irradiated from the second lens array 22 is converged into a light beam parallel to a main light beam of the sub light beam.

The optical device 40 modulates the incident light beam in accordance with image information and forms a color image. The optical device 40 includes liquid crystal panels 42R, 42G and 42B (respectively on the red, green and blue color light sides) and a cross dichroic prism 43, the liquid crystal panels being optical modulators which are to be irradiated objects. Incident-side polarization plates 44 are respectively interposed between the field lenses 41 and the liquid crystal panels 42R, 42G, 42B. Irradiation-side polarization plates 45 are interposed between the liquid crystal panels 42R, 42G, 43B and the cross dichroic prism 43. The incident-side polarization plates 44, the liquid crystal panels 42R, 42G, 42B and the irradiation-side polarization plates 45 modulate light of the incident color light.

The liquid crystal panels 42R, 42G, 42B each include a pair of transparent glass substrates with liquid crystal (electrooptic material) sealed therebetween and modulate the polarization direction of the polarization light beam irradiated from the incident-side polarization plate 44 in accordance with a received image signal using, for example, a polycrystalline silicon TFT (Thin Film Transistor) as a switching element.

The cross dichroic prism 43 combines the modulated optical images that are irradiated from the irradiation-side polarization plates 45 and modulated for each color to form an optical image (a color image). The cross dichroic prism 43 is in a substantially square shape in plan view and is formed of four right-angle prisms attached together, dielectric multi-layer films being formed on the boundaries of the right-angle prisms. One of the dielectric multi-layer films in a substantially X shape reflects the red color light and the other film reflects the blue color light. The red color light and the blue color light are bent by the dielectric multi-layer films and aligned in a proceeding direction of the green color light. Thus, the color light in the three colors are combined.

The color image irradiated from the cross dichroic prism 43 is projected by the projection optical system 50 in an enlarged manner, forming a large screen image on a screen (not shown).

Arrangement of Light Source Device

Figure 2:
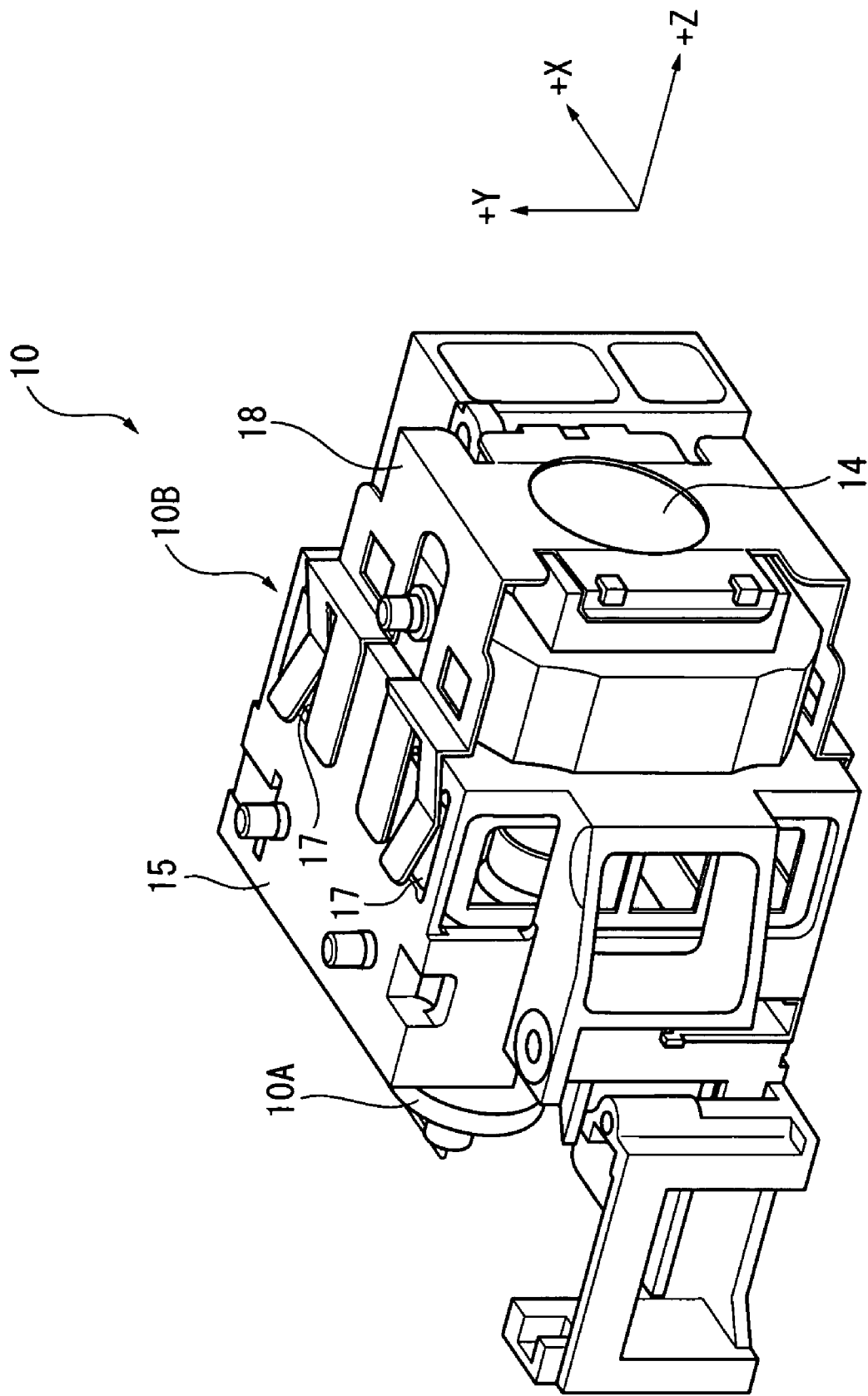
FIG. 2 is an illustration briefly showing a light source device of the aforesaid exemplary embodiment.
Figure 3:
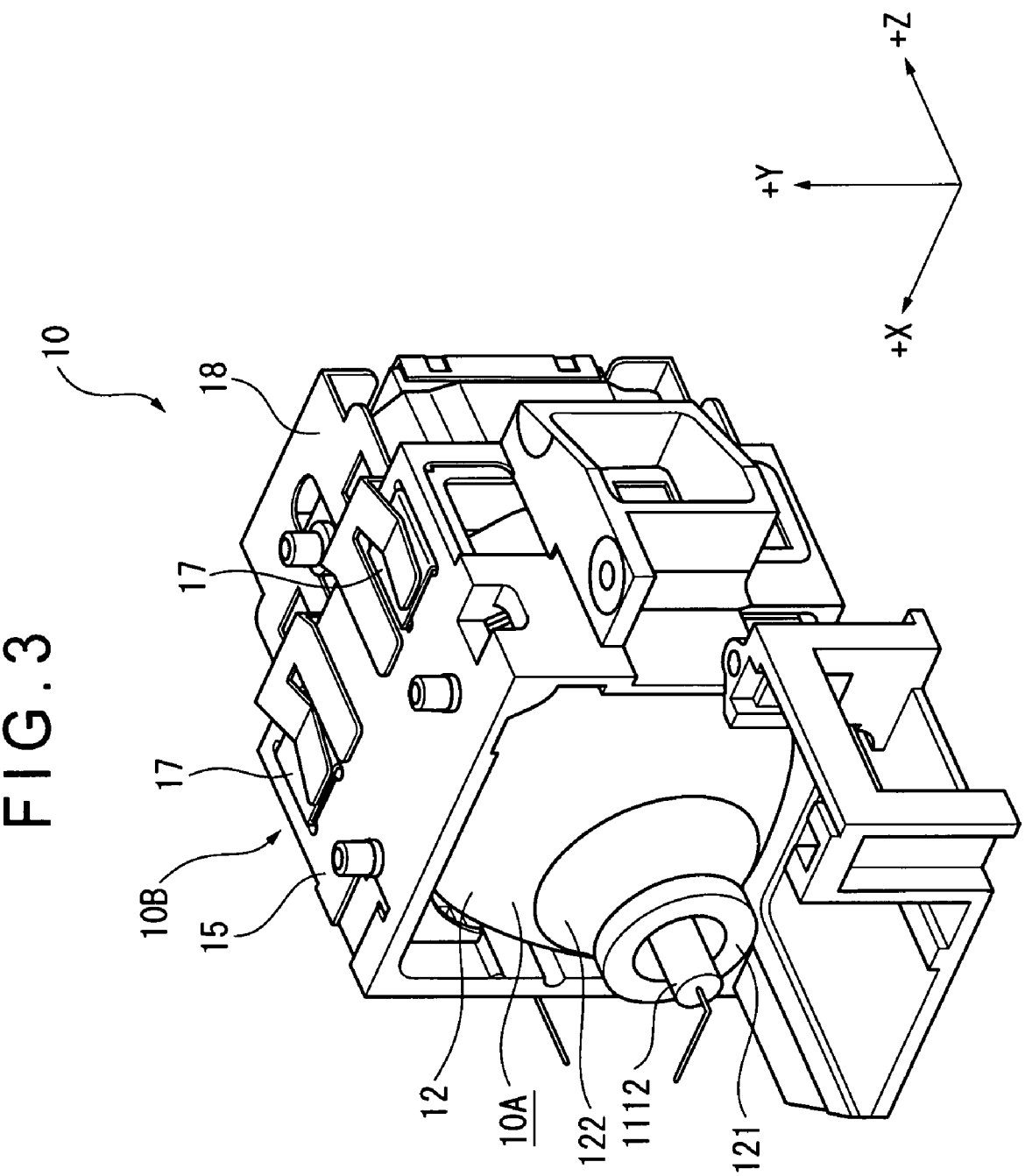
FIG. 3 is an illustration briefly showing the light source device of the aforesaid exemplary embodiment.
Figure 4:
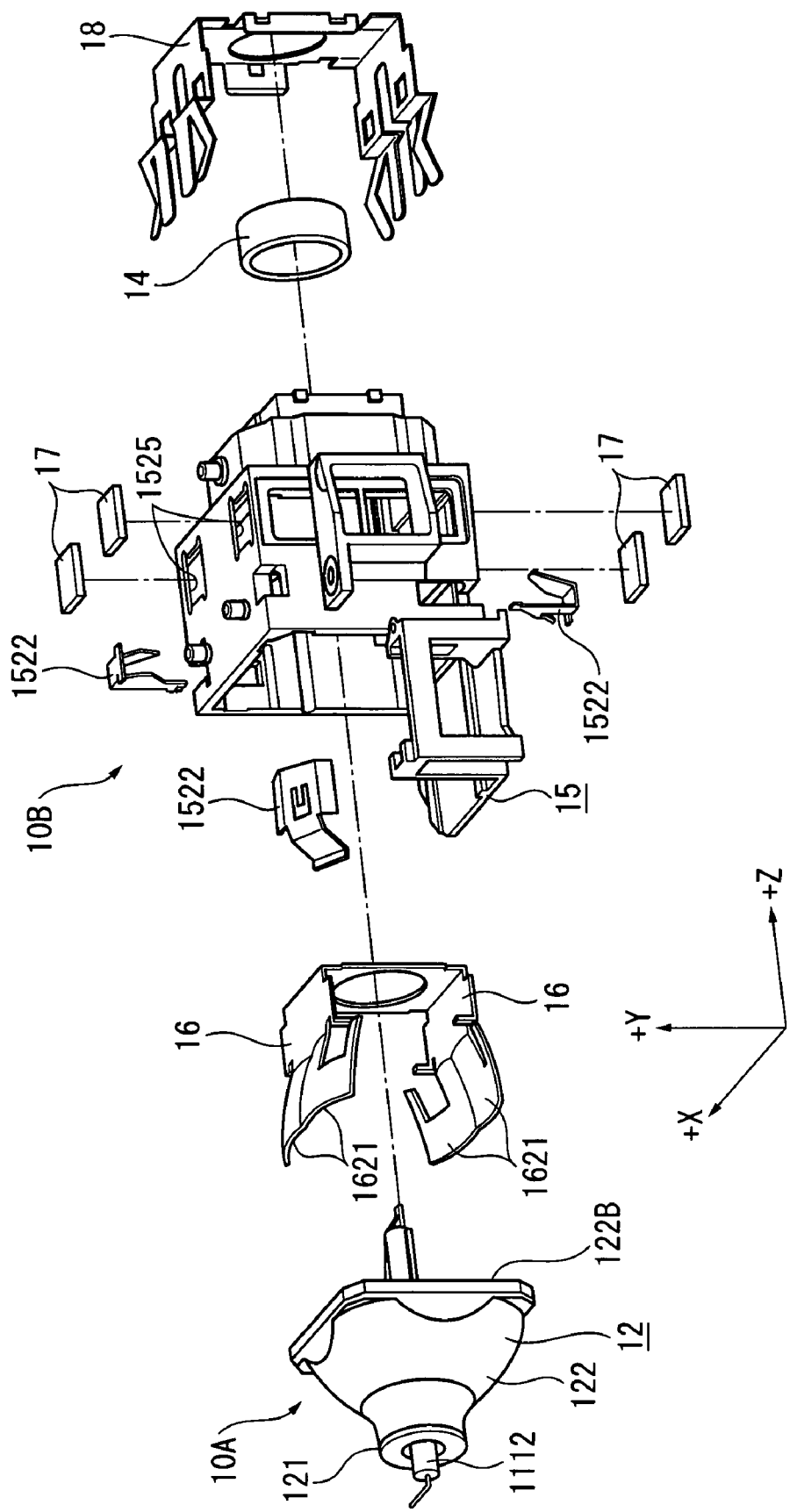
FIG. 4 is an illustration briefly showing the light source device of the aforesaid exemplary embodiment.

FIGS. 2 to 4 briefly show the light source device 10. Specifically, FIG. 2 is a perspective view of the light source device 10 seen from a light irradiation front side. FIG. 3 is a perspective view of the light source device 10 seen from a light irradiation back side. FIG. 4 is an exploded perspective view of the light source device 10 seen from the light irradiation back side.

Note that in the description below, the center axis of a light beam irradiated from the light source device 10 (the illumination optical axis A) is defined as the Z-axis, while two axes orthogonal to the Z-axis are defined as the X-axis (the horizontal axis) and the Y-axis (the vertical axis) for easy understanding.

As shown in FIGS. 2 to 4, the light source device 10 includes a light source device main body 10A, the parallelizing concave lens 14 (FIGS. 2 and 4) and the lamp housing 10B.

Arrangement of Light Source Device Main Body

Figure 5:
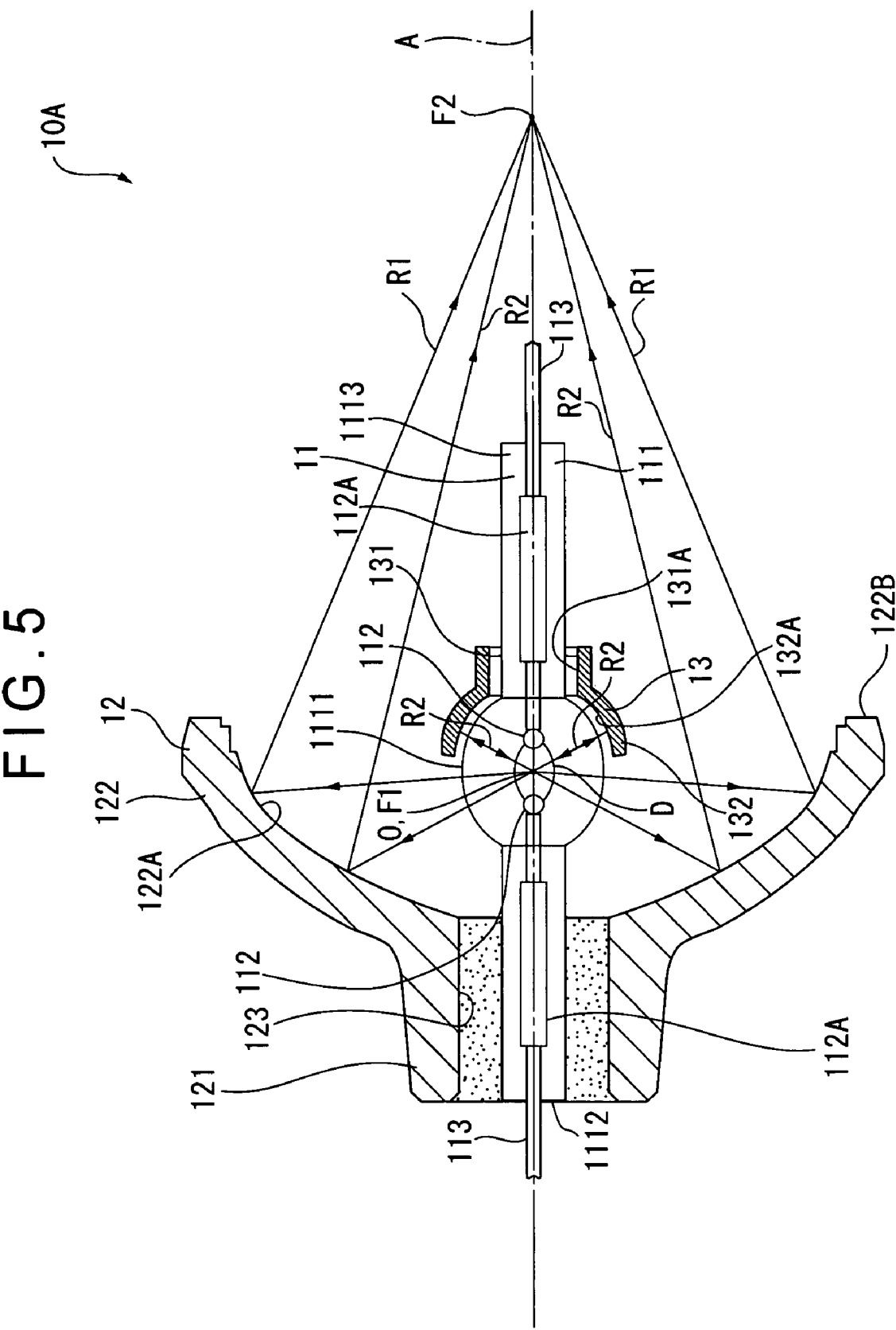
FIG. 5 is a cross section briefly showing a light source device main body of the aforesaid exemplary embodiment.

FIG. 5 is a cross section briefly showing the light source device main body 10A.

The light source device main body 10A integrally includes the light source lamp 11, the main reflecting mirror 12 and the sub reflecting mirror 13.

Arrangement of Light Source Lamp

As shown in FIG. 5, the light source lamp 11 includes: a light emitting tube 111 made with a silica glass tube; a pair of electrodes 112 disposed in the light emitting tube 111; and a sealing article (not shown).

The light source lamp 11 may be any lamp selected from various light source lamps capable of emitting light with high brightness such as a metal halide lamp, a high-pressure mercury lamp and an extra high-pressure mercury lamp.

The light emitting tube 111 includes a substantially spherically-bulging light emitting portion 1111 at a center position and a pair of sealing portions 1112, 1113 respectively extending from ends of the light emitting portion 1111.

In the light emitting portion 1111, a discharge space in a substantially spherical shape is formed, in which the pair of electrodes 112, mercury, a noble gas and a small amount of halogen are sealed.

In the pair of sealing portions 1112, 1113, metal foils 112A of molybdenum are inserted and sealed by a glass material or the like, the metal foils 112A being electrically connected with the pair of electrodes 112. The metal foils 112A are connected with lead wires 113 (electrode-connecting wires), the lead wires 113 extending to the outside of the light source lamp 11.

As shown in FIG. 5, when a voltage is applied on the lead wires 113, an electric potential difference is generated between the pair of electrodes 112 via the metal foils 112A to generate a discharge, thereby generating an arc image D so that the inside of the light emitting portion 1111 emits light. Note that in the description below, the center of light emission is a center position O of the arc image D generated between the pair of electrodes 112. In addition, the center position O of the arc image D is positioned substantially at the middle of the pair of electrodes 112. Further, the center position O of the arc image D is positioned substantially on an intersection of the center axis of the light emitting tube 111 extending along the extending direction of the sealing portions 1112, 1113 (the center axis being on the illumination optical axis A in FIG. 5) and a cross section cut in a plane orthogonal to the illumination optical axis A at a most-bulging point of the light emitting portion 1111, the intersection being the center of the light emitting tube 111.

As shown in FIGS. 3 to 5, the main reflecting mirror 12 is an integrally-molded transparent glass article including a neck-like portion 121 in which the sealing portions 1112 on a base end side of the light source lamp 11 is inserted and a reflecting portion 122 having a concave curved surface extending outward from the neck-like portion 121.

As shown in FIG. 5, the neck-like portion 121 is formed to have a substantially cylindrical insertion hole 123 at the center. In the center of the insertion hole 123, the sealing portion 1112 is disposed.

The reflecting portion 122 includes a reflecting surface 122A made by depositing a metal thin film on a glass surface in a rotary curved shape. The reflecting surface 122A herein is a cold mirror that reflects visible light and transmits infrared and ultraviolet rays.

The light source lamp 11 disposed in the reflecting portion 122 of the main reflecting mirror 12 is positioned such that the center position O of the arc image D is in the vicinity of a first focal position F1 of the rotary curved shape of the reflecting surface 122A of the reflecting portion 122.

As shown in FIG. 5, when the light source lamp 11 is turned on, a light beam R1 toward the main reflecting mirror 12 out of light beams irradiated from the light emitting portion 1111 is reflected by the reflecting surface 122A of the reflecting portion 122 of the main reflecting mirror 12 to be convergent light converged on a second focal position F2 of the rotary curved shape.

As shown in FIG. 4 or 5, an end of the reflecting portion 122 on the light irradiation front side substantially intersects with the center axis of the light emitting tube 111 (the center axis being on the illumination optical axis A in FIG. 5) and extends toward the outside, the end having a rectangular frame shape in plan view. The end of the reflecting portion 122 on the light irradiation front side functions as a positioning portion 122B for positioning the light source device main body 10A in the lamp housing 10B.

As shown in FIG. 5, the sub reflecting mirror 13 includes: a substantially cylindrical neck-like portion 131 in which the sealing portion 1113 of the light emitting tube 111 of the light source lamp 11 is inserted; and a reflecting portion 132 which is a substantially spherical surface extending outward from the neck-like portion 131, the neck-like portion 131 and the reflecting portion 132 being integrally formed.

The neck-like portion 131 fixes the sub reflecting mirror 13 to the light source lamp 11. As shown in FIG. 5, by inserting the sealing portion 1113 of the light source lamp 11 through the cylindrical insertion hole 131A, the sub reflecting mirror 13 is set to the light source lamp 11. An inner peripheral surface of the insertion hole 131A is an adhesion surface filled with a fixation adhesive with the sealing portion 1113. Thus, by providing the neck-like portion 131 to the sub reflecting mirror 13, a fixation region of the sub reflecting mirror 13 to the light source lamp 11 can be larger compared with an arrangement in which no neck-like portion 131 is provided, thereby appropriately maintaining the fixation of the sub reflecting mirror to the light source lamp 11.

As shown in FIG. 5, the reflecting portion 132 is a reflection member in a cup-like shape which covers a substantially front half of the light emitting portion 1111 of the light source lamp 11 when the sub reflecting mirror 13 is set to the light source lamp 11.

An inner surface of the reflecting portion 132 is a reflecting surface 132A in a spherical surface shape similarly to the spherical surface of the light emitting portion 1111 of the light source lamp 11. Note that the reflecting surface 132A is a cold mirror that reflects visible light and transmits infrared and ultraviolet rays similarly to the reflecting surface 122A of the main reflecting mirror 12.

The above-described sub reflecting mirror 13 may be made with a low thermal expanding material and/or a high thermal conducting material, for example a material of inorganic system such as quartz, alumina ceramics and the like.

As shown in FIG. 5, by attaching the above-described sub reflecting mirror 13 to the light emitting tube 111, a light beam R2 toward the opposite side (the front side) of the main reflecting mirror 12 out of light beams irradiated from the light emitting portion 1111 is converged on the second focal position F2 similarly to the light beam R1 directly irradiated from the light source lamp 11 on the reflecting surface 122A of the main reflecting mirror 12.

Arrangement of Lamp Housing

The lamp housing 10B integrates the light source device main body 10A and the parallelizing concave lens 14 and sets these components at a predetermined position in the outer housing 10C. As shown in FIGS. 2 to 4, the lamp housing 10B includes a lamp housing main body (an inner housing) 15 as a supporting member, an unused-light reflecting member 16 (FIG. 4), an absorber 17 and a biasing member 18.

Arrangement of Lamp Housing Main Body

Figure 6:
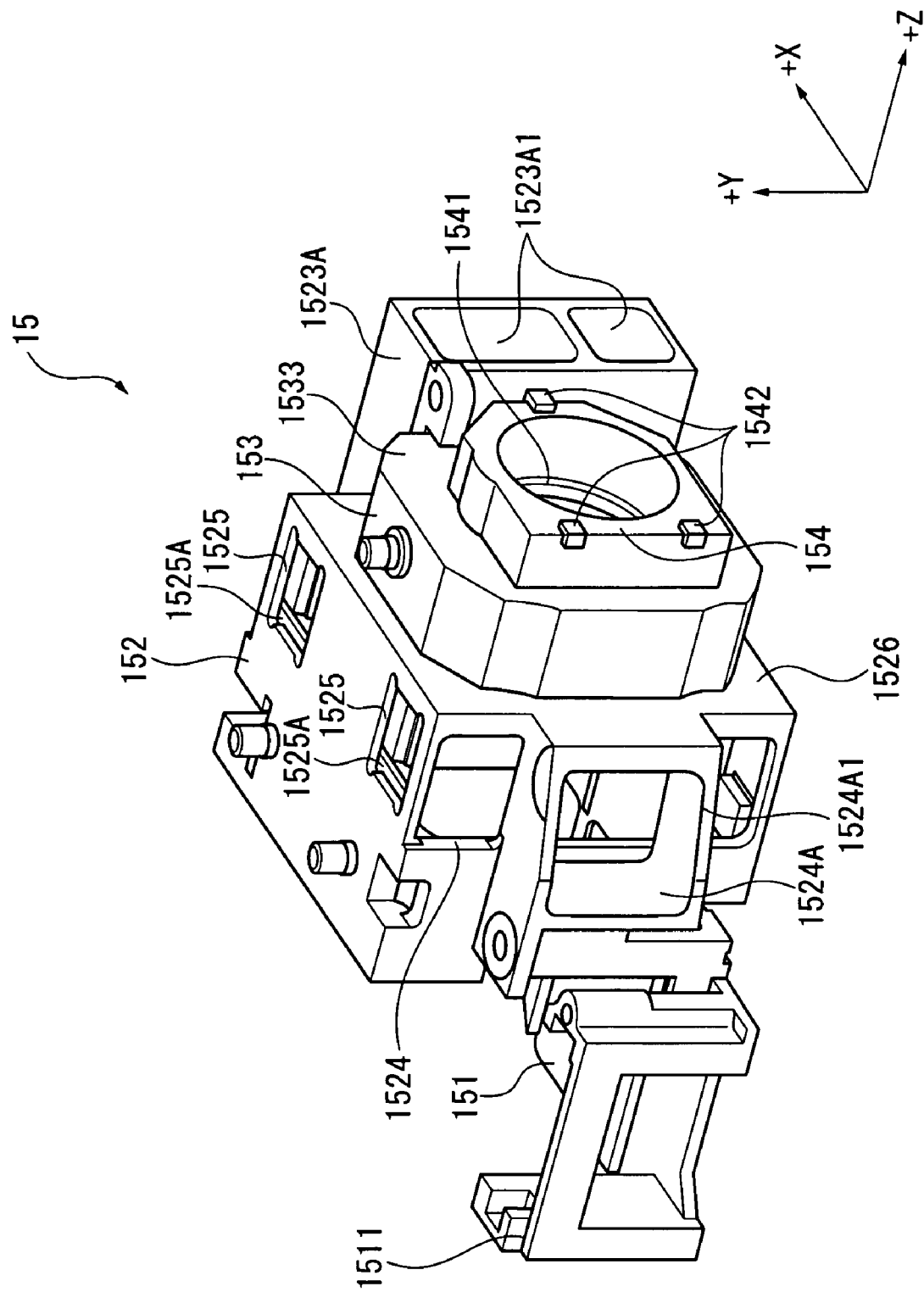
FIG. 6 is a perspective view briefly showing a lamp housing main body of the aforesaid exemplary embodiment.
Figure 7:
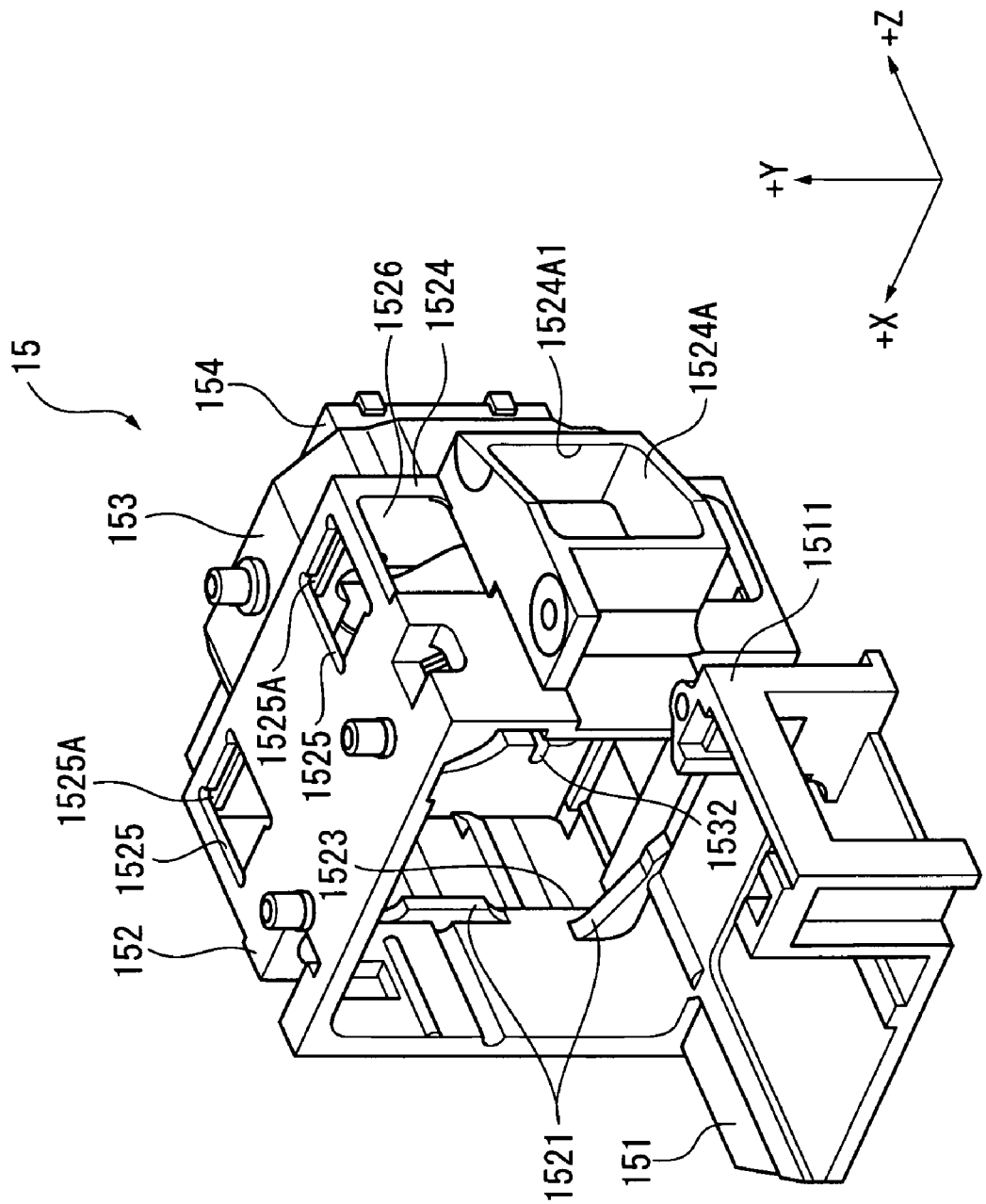
FIG. 7 is a perspective view briefly showing the lamp housing main body of the aforesaid exemplary embodiment.

FIGS. 6 and 7 each show a perspective view briefly showing the lamp housing main body 15. Specifically, FIG. 6 is a perspective view of the lamp housing main body 15 seen from the light irradiation front side. FIG. 7 is a perspective view of the lamp housing main body 15 seen from the light irradiation back side.

The lamp housing main body 15 is injection-molded from synthetic resin. A surface of the lamp housing main body 15 is antireflection-treated. As shown in FIG. 2 or 3, the lamp housing main body 15 supports the light source device main body 10A and the parallelizing concave lens 14 and integrates these components 10A, 14. As shown in FIG. 6 or 7, the lamp housing main body 15 includes a base 151, a light source device main body supporting portion 152, a reflecting member attaching portion 153 and a parallelizing concave lens supporting portion 154.

As shown in FIG. 6 or 7, the base 151 is a plate which covers the light irradiation back side of the main reflecting mirror 12 (on the minus Z-axis side in FIG. 6 or 7) when the light source device 10 is assembled.

As shown in FIG. 6 or 7, on an end in the minus X-axis direction of the base 151, a connector attaching portion 1511 for attaching a connector (not shown) is formed upward.

The connector is connected with the lead wires 113 that is connected to the light source lamp 11. The connector is also connected to a connector (not shown) provided to the outer housing 10C when the light source device 10 is accommodated in the outer housing 10C. When both connectors are in connection, electricity is supplied from the power unit to the light source lamp 11.

The light source device main body supporting portion 152 supports the light source device main body 10A and has a rectangular tubular frame shape in plan view as shown in FIG. 6 or 7. The light source device main body supporting portion 152 is connected with the base 151 at a lower end (on the minus Y-axis direction side in FIG. 6 or 7) and on the light irradiation back side (on the minus Z-axis direction side in FIG. 6 or 7).

As shown in FIG. 7, on an inner surface of the tubular shape of the light source device main body supporting portion 152, a plurality of projections 1521 are provided at a substantially central position in the Z-axis direction so as to project toward the inside of the light source device main body supporting portion 152, the plurality of projections 1521 positioning the light source device main body supporting portion 152 (only two of the plurality of projections 1521 are shown in FIG. 7). Surfaces of the projections 1521 on the light irradiation back side (surfaces on the minus Z-axis side in FIG. 7) are substantially flush. The light source device main body 10A is positioned at a predetermined position relative to the lamp housing main body 15 by having the positioning portion 122B of the main reflecting mirror 12 abutting on the surfaces of the projections 1521 on the light irradiation back side. The light source device main body 10A is supported and fixed to the lamp housing main body 15 by biasing the positioning portion 122B to the projections 1521 with three spring members 1522 (FIG. 4). In this state, an open portion of the tubular shape of the light source device main body supporting portion 152 is closed by the light source device main body 10A.

As shown in FIG. 6 or 7, in surfaces of the light source device main body supporting portion 152 in the X-axis direction, openings 1523 (FIG. 7), 1524 of rectangular shapes in plan view are provided such that air can flow in the light source device main body supporting portion 152.

As shown in FIG. 6, an inlet duct 1523A is integrally formed on the opening 1523.

The inlet duct 1523A projects in the plus X-axis direction from a peripheral portion of the opening 1523. An end portion is bent to extend toward the light irradiation front side (in the plus Z-axis direction in FIG. 6) such that an introduction hole 1523A1 (FIG. 6) is directed to the light irradiation front side. When cooling air is sent to the introduction hole 1523A1 with a cooling fan or the like of the cooling unit, the cooking air flows in the inlet duct 1523A in the minus Z-axis direction and bends substantially at 90 degrees into the minus X-axis direction to flow into the light source device main body supporting portion 152 via the opening 1523. The cooling air is supplied into the light source device main body supporting portion 152, so that the light source lamp 11 of the light source device main body 10A is also supplied with cooling air and cooled.

As shown in FIG. 6 or 7, an outlet duct 1524A is integrally formed on the opening 1524.

As shown in FIG. 6 or 7, the outlet duct 1524A projects in the minus X-axis direction from a portion that partially covers the opening 1524 such that a discharge hole 1524A1 is directed in the minus X-axis direction. Air in the light source device main body supporting portion 152 is sucked via the discharge hole 1524A1 by an outlet fan or the like of the cooling unit disposed in the vicinity of the discharge hole 1524A1, so that the inside air can be exhausted to the outside of the projector 1.

Openings 1525 are formed on upper and lower surfaces (in the Y-axis direction in FIG. 6 or 7) of the light source device main body supporting portion 152, the openings 1525 passing a light beam reflected by the unused-light reflecting member 16 to the outside of the lamp housing main body 15. The number of the opening 1525 is determined in accordance with the number of a later-described reflecting surface of the unused-light reflecting member 16. In the exemplary embodiment, four openings 1525 are provided: two on the upper surface (FIG. 6, FIG. 7) and two on the lower surface.

As shown in FIG. 6 or 7, a projection 1525A is provided for each opening 1525 so as to project toward the inner side of the opening 1525. The projection 1525A is adapted to support the absorber 17, so that the absorber 17 is positioned in the opening 1525.

Note that FIGS. 6 and 7 only show the openings 1525 and the projections 1525A on the upper surface, but the opening 1525 and the projection 1525A are also provided on the lower surface.

As shown in FIG. 6 or 7, a surface of the light source device main body supporting portion 152 on the light irradiation front side (on the plus Z-axis direction side in FIG. 6 or 7) extends inward such that an opening area becomes small. Provided on this surface is a connecting portion 1526 connecting with the reflecting member attaching portion 153.

Figure 8:
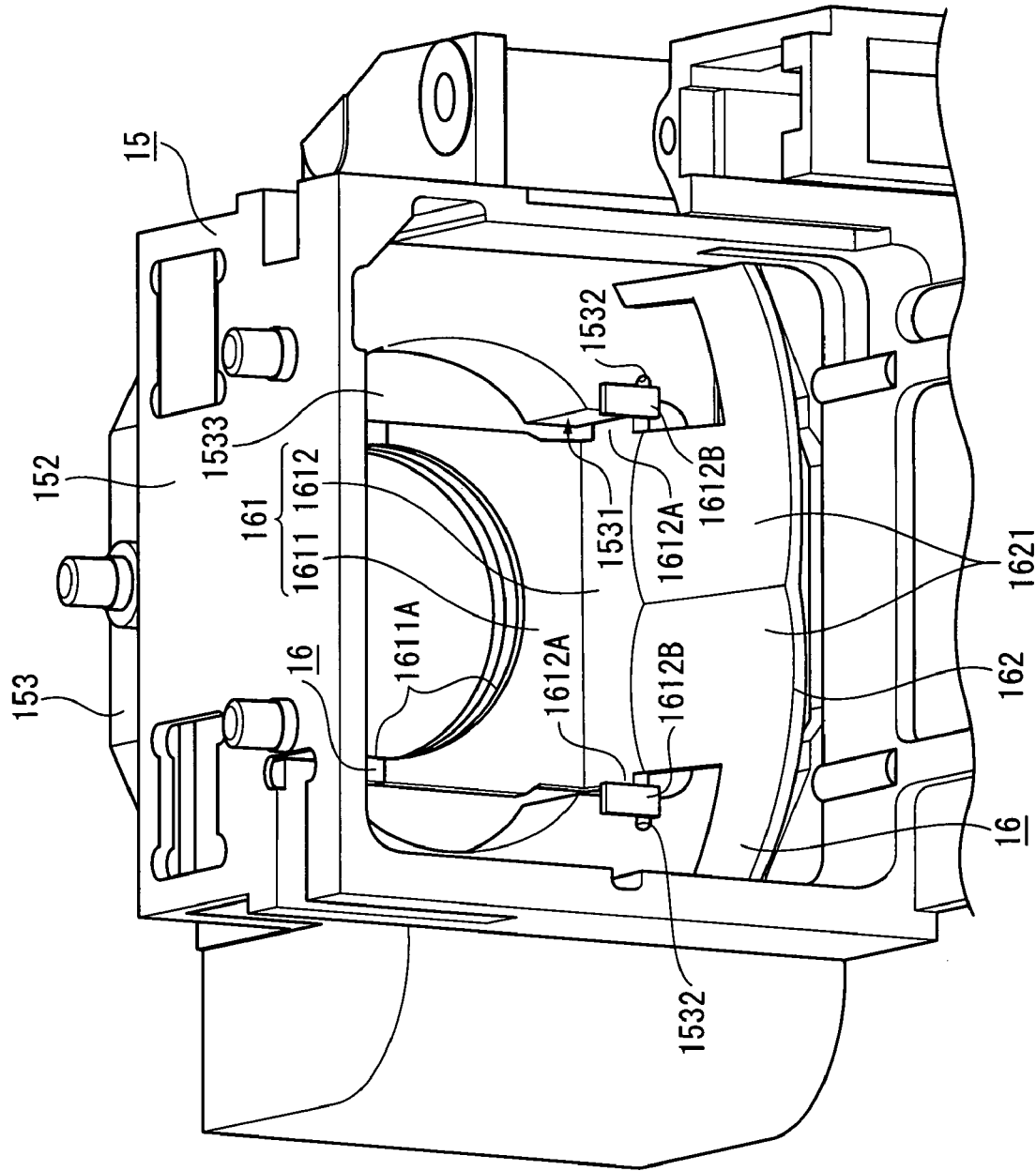
FIG. 8 is an illustration showing a reflecting member attached to a reflecting member attaching portion of the aforesaid exemplary embodiment.

FIG. 8 shows the unused-light reflecting member 16 attached to the reflecting member attaching portion 153. Specifically, FIG. 8 is a perspective view of an inner side of the lamp housing main body 15 seen from the light irradiation back side.

The reflecting member attaching portion 153 is a portion on which the unused-light reflecting member 16 is attached. As shown in FIG. 6 or 7, the reflecting member attaching portion 153 extends from the connecting portion 1526 toward the light irradiation front side (in the plus Z-axis direction in FIGS. 6 and 7), forming a substantially tubular rectangular shape in plan view.

As shown in FIG. 8, an inner surface of the tubular shape of the reflecting member attaching portion 153 is in a substantially circular shape in plan view. As shown in FIG. 8, concave portions 1531 are provided on upper and lower sides of the inner surfaces of the reflecting member attaching portion 153 (surfaces in the Y-axis direction in FIG. 8), the concave portions 1531 dented toward the outer sides. Note that FIG. 8 only shows the concave portions 1531 on the lower side, but the concave portions 1531 are also provided on the upper side in a similar manner.

As shown in FIG. 8, each concave portion 1531 is provided with a pair of grooves 1532 vertically in parallel and extending from a surface on the light irradiation back side of the concave portion 1531 (on the minus Z-axis direction side in FIG. 8) toward the light irradiation front side. Note that FIG. 8 only shows the pair of grooves 1532 in the concave portion 1531 on the lower side, but the pair of grooves 1532 is also provided in the concave portion 1531 on the upper side in a similar manner.

As shown in FIG. 6 or 8, a surface of the reflecting member attaching portion 153 on the light irradiation front side (on the plus Z-axis direction side in FIGS. 6 to 8) extends inward such that an opening area becomes small. The connecting portion 1533 is provided on the surface, the connecting portion 1533 connecting with the parallelizing concave lens supporting portion 154.

The parallelizing concave lens supporting portion 154 is a portion to support the parallelizing concave lens 14. As shown in FIG. 6 or 7, the parallelizing concave lens supporting portion 154 extends from the connecting portion 1533 toward the light irradiation front side (in the plus Z-axis direction in FIG. 6 or 8), forming a substantially tubular rectangular shape in plan view.

As shown in FIG. 6, an inner surface of the tubular shape of the parallelizing concave lens supporting portion 154 is in a substantially circular shape in plan view. As shown in FIG. 6, a projection 1541 is provided on an inner surface of the tubular shape, the projection 1541 being in a circular shape in plan view and projecting inward and positioning the parallelizing concave lens 14. As shown in FIG. 6, a surface of the projection 1541 on the light irradiation front side is flat. The parallelizing concave lens 14 abuts on the surface of the projection 1541 on the light irradiation front side so as to be positioned at a predetermined position relative to the lamp housing main body 15. The parallelizing concave lens 14 is biased and fixed by the biasing member 18 to the light irradiation front side surface of the projection 1541. In this state, an open portion of the tubular shape of the parallelizing concave lens supporting portion 154 is closed by the parallelizing concave lens 14.

As shown in FIG. 6 or 7, a surface of the parallelizing concave lens supporting portion 154 on the light irradiation front side (on the plus Z-axis direction side in FIGS. 6 and 7) is provided with three hooks 1542 engaging with the biasing member 18.

Arrangement of Reflecting Member

Figure 9:
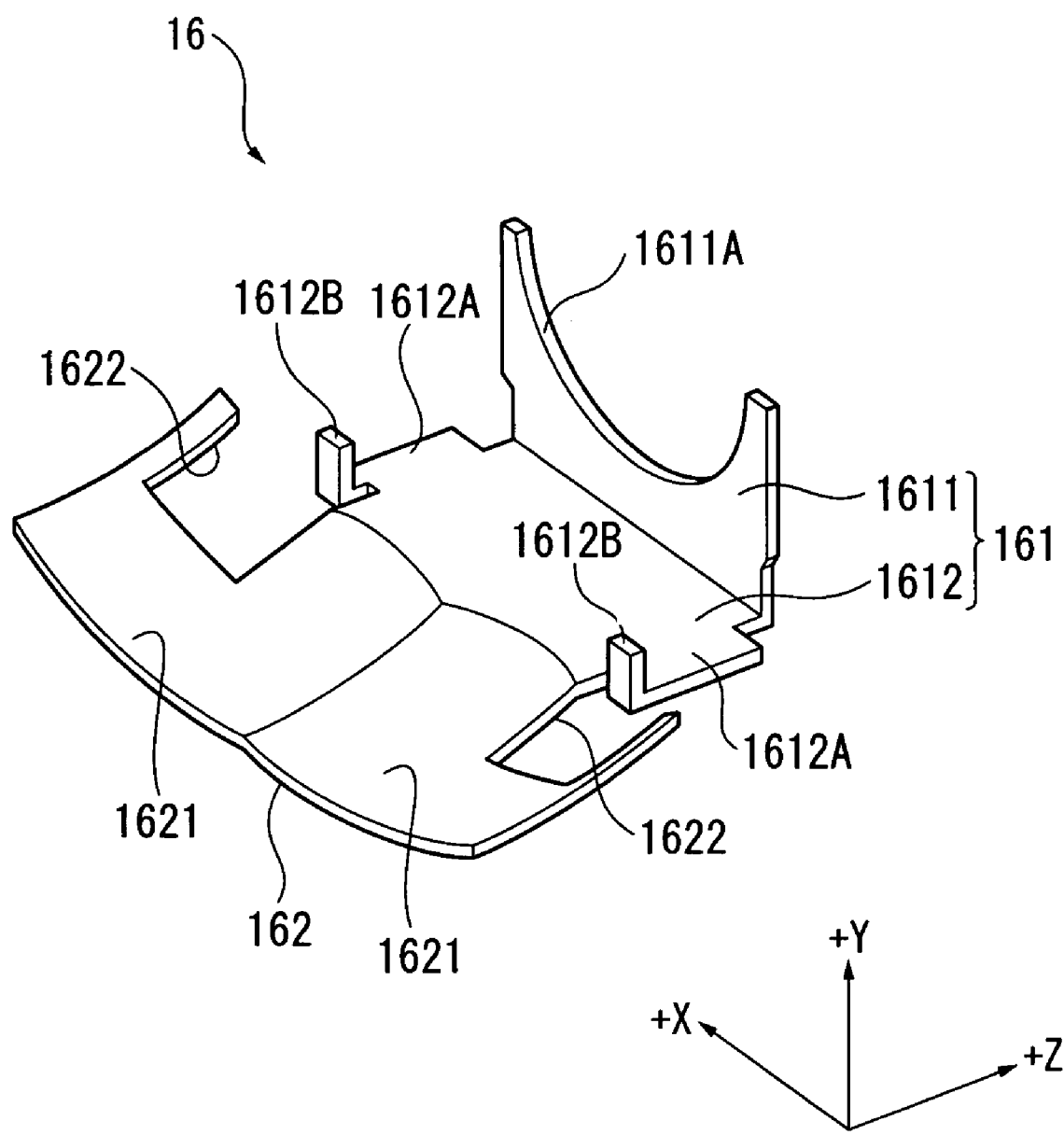
FIG. 9 is an illustration briefly showing the reflecting member of the aforesaid exemplary embodiment.
Figure 10A:
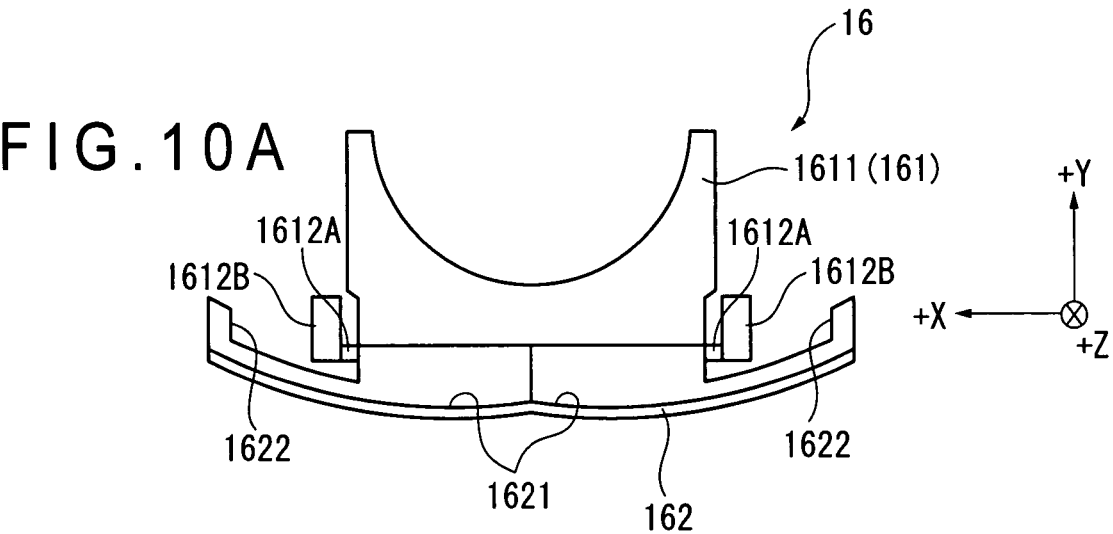
FIG. 10A is an illustration briefly showing the reflecting member of the aforesaid exemplary embodiment.
Figure 10B:
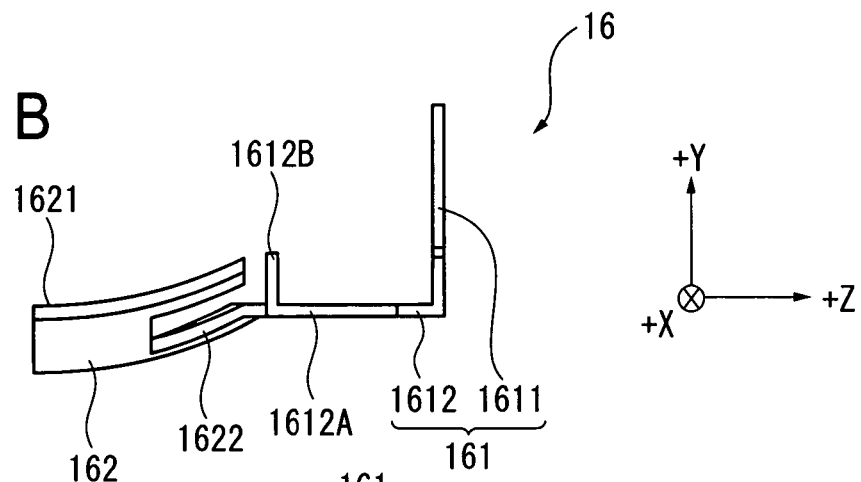
FIG. 10B is an illustration briefly showing the reflecting member of the aforesaid exemplary embodiment.
Figure 10C:
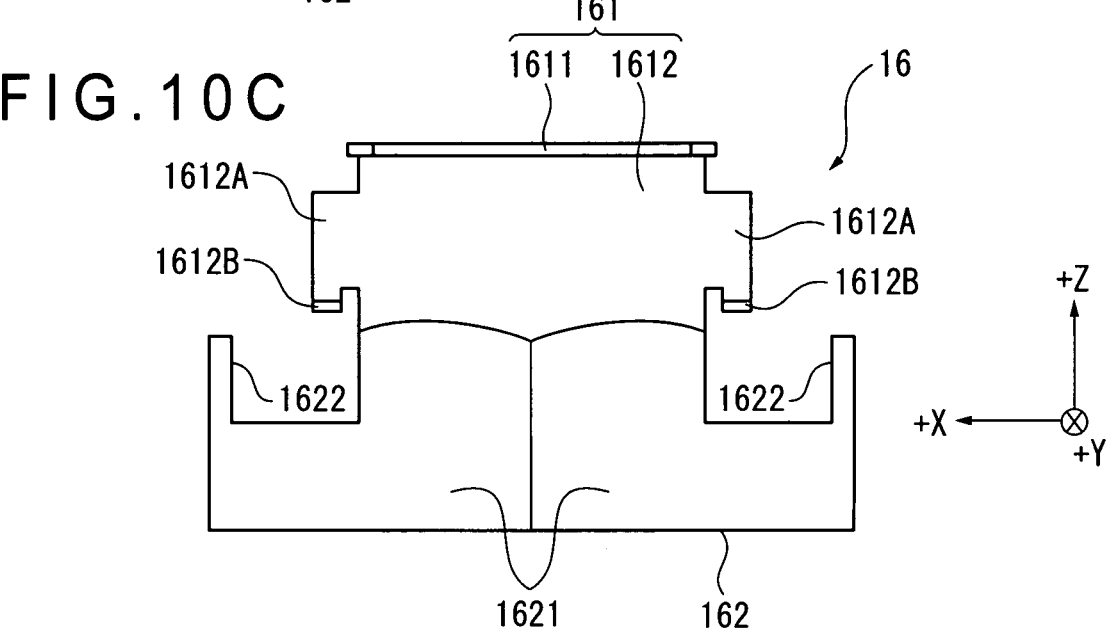
FIG. 10C is an illustration briefly showing the reflecting member of the aforesaid exemplary embodiment.

FIGS. 9, 10A, 10B and 10C briefly show the unused-light reflecting member 16. Specifically, FIG. 9 is a perspective view of the unused-light reflecting member 16 seen from the light irradiation back side. FIG. 10A shows the unused-light reflecting member 16 seen from the light irradiation back side. FIG. 10B is a side elevational view of the unused-light reflecting member 16 seen from a lateral side (in the X-axis direction). FIG. 10C is a plan view of the unused-light reflecting member 16 seen from an unused-light reflection side.

As shown in FIG. 4, the unused-light reflecting member 16 is disposed on the light irradiation front side of the main reflecting mirror 12 of the light source device main body 10A (the plus Z-axis direction side in FIG. 4). The unused-light reflecting member 16 reflects unused light R3 irradiated outside the main reflecting mirror 12 of light beams irradiated from the light source lamp 11 (see FIGS. 11A, 11B and 12) to guide the light R3 to the outside of the light source device 10 (the outside of the lamp housing main body 15). As shown in FIG. 4, the unused-light reflecting member 16 includes two unused-light reflecting members 16 disposed such that unused-light reflecting surfaces 1621 of each unused-light reflecting member 16 face to each other in a vertical direction (the Y-axis direction in FIG. 4). Note that the two unused-light reflecting members 16 have a common arrangement, so that only one unused-light reflecting member 16 will be described below.

As shown in FIGS. 9, 10A, 10B and 10C, the unused-light reflecting member 16 includes a base 161 and a reflecting portion 162.

The base 161 is a portion to be attached in the reflecting member attaching portion 153 of the lamp housing main body 15. As shown in FIGS. 9, 10A, 10B and 10C, the base 161 has a substantially L shape in side view.

As shown in FIGS. 9, 10A, 10B and 10C, an L-shape vertical portion 1611 of the base 161 has a cutout 1611A in a substantially circular shape in plan view such that a light beam irradiated from the light source device main body 10A can pass through toward the parallelizing concave lens 14 even when the unused-light reflecting member 16 is attached to the reflecting member attaching portion 153.

As shown in FIGS. 9, 10A, 10B and 10C, an L-shape horizontal portion 1612 of the base 161 has a substantially rectangular shape in plan view.

As shown in FIGS. 9, 10A, 10B and 10C, insertion portions 1612A are formed on ends of the L-shape horizontal portion 1612 in the X-axis direction, the insertion portions 1612A extending in parallel to a horizontal surface (an X-Z plane) and being inserted in the pair of grooves 1532 of the reflecting member attaching portion 153.

On ends of the insertion portions 1612A on the light irradiation back side (the minus Z-axis direction side in FIG. 9), positioning projections 1612B are formed so as to be bent substantially in parallel to the L-shape vertical portion 1611. The positioning projections 1612B abut on the surface of the concave portion 1531 on the light irradiation back side (on the minus Z-axis direction side in FIG. 8) when the unused-light reflecting member 16 is attached to the reflecting member attaching portion 153, the positioning projections 1612B positioning the unused-light reflecting member 16 at a predetermined position relative to the lamp housing main body 15.

Specifically, as shown in FIG. 8, the pair of insertion portions 1612A is inserted in the pair of grooves 1532, so that the pair of positioning projections 1612B abuts on the surface of the concave portion 1531 on the light irradiation back side, thereby attaching and positioning the unused-light reflecting member 16 on the lamp housing main body 15. Note that FIG. 8 only shows the lower side (the minus Y-direction side in FIG. 8). However, the unused-light reflecting member 16 is also attached on the upper side of the lamp housing main body 15 (the plus Y-axis direction side in FIG. 8) in a similar manner. In this state, as shown in FIG. 8, the L-shape vertical portion 1611 of the unused-light reflecting member 16 is disposed along the connecting portion 1533 of the reflecting member attaching portion 153, and the cutouts 1611A are connected with each other to form a substantially circular opening in the substantially same shape to the opening of the connecting portion 1533. Accordingly, the light beam reflected by the main reflecting mirror 12 and converged on the second focal position F2 (i.e. used light) is not blocked by the unused-light reflecting member 16, so that the light beam can be incident on the parallelizing concave lens 14 through the opening.

Figure 11A:
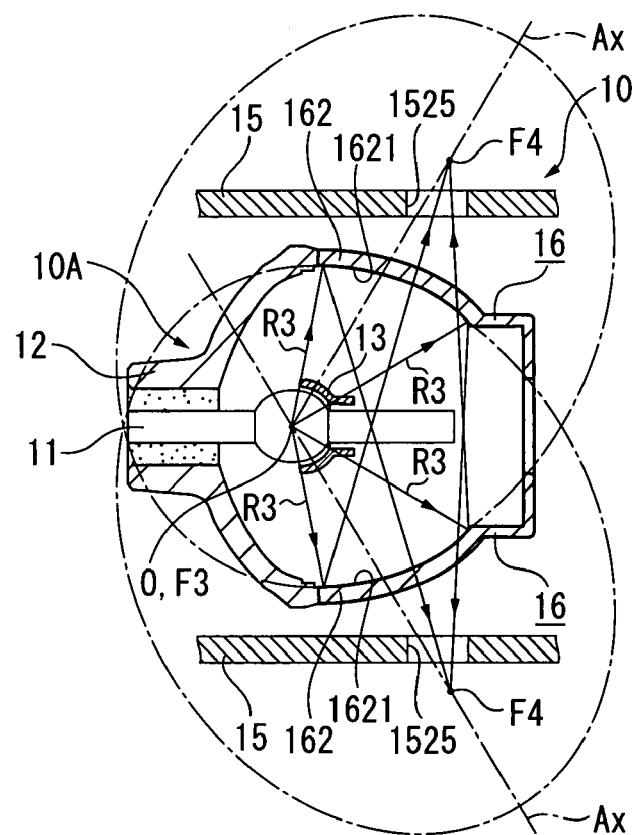
FIG. 11A is an illustration showing trajectories of a light beam reflected by a reflecting portion of the aforesaid exemplary embodiment.
Figure 11B:
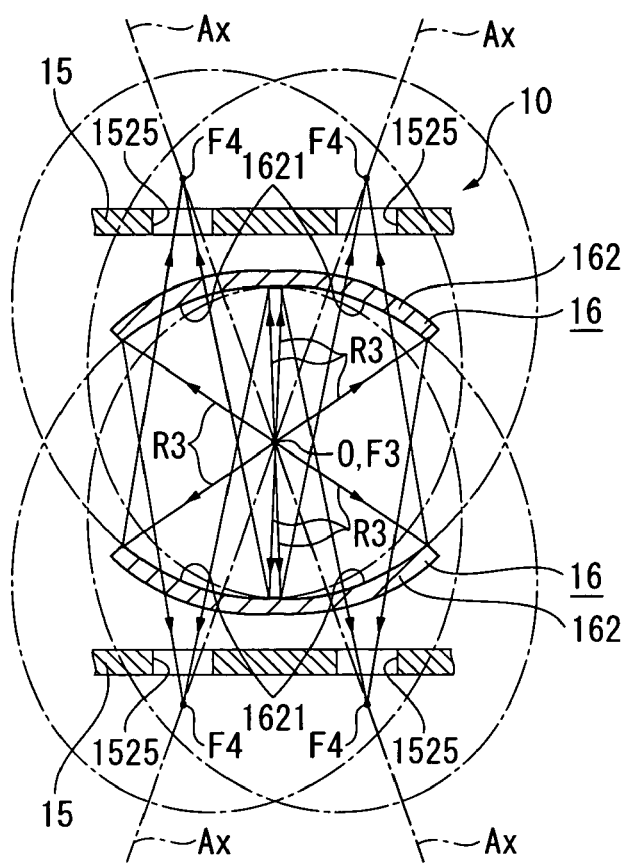
FIG. 11B is an illustration showing trajectories of the light beam reflected by the reflecting portion of the aforesaid exemplary embodiment.

FIGS. 11A, 11B and 12 show trajectories of the unused light R3 reflected by the reflecting portion 162. FIG. 11A schematically shows the light source device main body 10A and the unused-light reflecting member 16 which are seen from a lateral side (in the X-axis direction). FIG. 11B schematically shows the light source device main body 10A and the unused-light reflecting member 16 which are seen in the illumination optical axis A direction. FIG. 12 is a perspective view showing trajectories of the unused light R3 reflected by the reflecting portion 162. Note that in FIGS. 11A, 11B and 12, some components are omitted for easy understanding.

The reflecting portion 162 reflects the unused light R3 outside the main reflecting mirror 12 irradiated from the light source lamp 11 (i.e. the unused light R3 which is nonvisible light of infrared and ultraviolet rays having passed the sub reflecting mirror 13 since the sub reflecting mirror 13 is provided in the exemplary embodiment), the reflecting portion 162 guiding the reflected light to the outside of the lamp housing main body 15. As shown in FIGS. 9, 10A, 10B and 10C, the reflecting portion 162 extends from ends of the L-shape horizontal portion 1612 of the base 161 on the light irradiation back side (i.e. ends on the minus Z-direction side in FIG. 9) toward the light irradiation back side.

As shown in FIGS. 9 to 12, a surface of the reflecting portion 162 (a surface facing the inside of the lamp housing main body 15 when the unused-light reflecting member 16 is attached to the lamp housing main body 15) is the unused-light reflecting surface 1621. As shown in FIGS. 9, 10A, 10B, 10C, 11B and 12, the unused-light reflecting surface 1621 includes two unused-light reflecting surfaces 1621 aligned in parallel in the X-axis direction in the exemplary embodiment.

As shown in FIGS. 11A, 11B and 12, each unused-light reflecting surface 1621 is an ellipsoidal surface with the first focal position F3 positioned on the center position O of the arc image D of the light source lamp 11 and the second focal position F4 positioned outside the lamp housing main body 15 when the unused-light reflecting member 16 is attached to the lamp housing main body 15.

As shown in FIG. 4, the four unused-light reflecting surfaces 1621 of the two unused-light reflecting members 16 are disposed such that the rotation axes Ax of the ellipsoidal surfaces (FIG. 11A, FIG. 11B) do not spatially coincide with each other (FIG. 11A, FIG. 11B).

As shown in FIG. 12, each unused-light reflecting surface 1621 is set such that the light source lamp 11 and the main reflecting mirror 12 are not in a space S defined by connecting the unused-light reflecting surface 1621 and the second focal position F4. Note that FIG. 12 only shows the space S of one of the four unused-light reflecting surfaces 1621 but each of the other three unused-light reflecting surfaces 1621 also set such that the light source lamp 11 and the main reflecting mirror 12 are not in each space S.

As shown in FIGS. 11A, 11B and 12, the unused light R3 outside the main reflecting mirror 12 of the light beams irradiated from the light source lamp 11 (the first focal position F3) is reflected by the unused-light reflecting surfaces 1621 and converged on the second focal positions F4 on the outside the lamp housing main body 15 via the openings 1525, where the reflected unused light R3 is not blocked by the light source lamp 11 and the main reflecting mirror 12.

As shown in FIGS. 9, 10A, 10B and 10C, each reflecting portion 162 is provided with a cutout 1622 in a substantially C-shape in plan view at an end on the light irradiation front side to avoid the unused light R3 reflected by the facing unused-light reflecting surface 1621 of the unused-light reflecting member 16. The unused light R3 passing the above-described space S passes through the cutout 1622 of the reflecting portion 162 and the opening 1525 of the lamp housing main body 15 to be converged on the second focal position F4 outside of the lamp housing main body 15.

Note that the above-described unused-light reflecting member 16 may be formed by molding or sheet-processing. The unused-light reflecting surfaces 1621 can have a high reflectivity by, for example, forming the unused-light reflecting surfaces 1621 into the above-described shape and conducting mirror-like finishing and the like thereon when the unused-light reflecting member 16 is made of a metal material such as aluminum. In addition to the mirror-like finishing on the unused-light reflecting surfaces 1621, the highly reflective unused-light reflecting surfaces 1621 may be formed by vapor-depositing a highly reflective material such as a silver alloy after forming the unused-light reflecting surfaces 1621 into the above-described shape.

Arrangement of Absorber

As shown in FIG. 4, the absorber 17 is provided by the number corresponding to the number of the openings 1525 of the lamp housing main body 15 (four absorbers in the exemplary embodiment). The absorbers 17 have the substantially same shape as the openings 1525. The absorbers 17 are respectively disposed in the openings 1525 via the biasing member 18. The absorbers 17 absorb and convert into heat the unused light R3 that is reflected by the unused-light reflecting surfaces 1621 of the unused-light reflecting members 16 and passes through the openings 1525.

The absorbers 17 may be formed with ceramics and alumite-treated aluminum, for example. In addition to the members made of ceramics and almite-treated aluminum, the absorbers 17 may be formed with any other material that absorbs an incident light beam and converts the incident light beam into heat.

The heat generated by the absorbers 17 is cooled by air flown via the openings 1523, 1524 of the lamp housing main body 15. Specifically, the air flown via the openings 1523, 1524 of the lamp housing main body 15 flows in the vicinity of the light source lamp 11 of the light source device main body 10A and cools the light source lamp 11. The air also flows between the unused-light reflecting members 16 and the absorbers 17 and cools the absorbers 17.

Arrangement of Biasing Member

Figure 13:
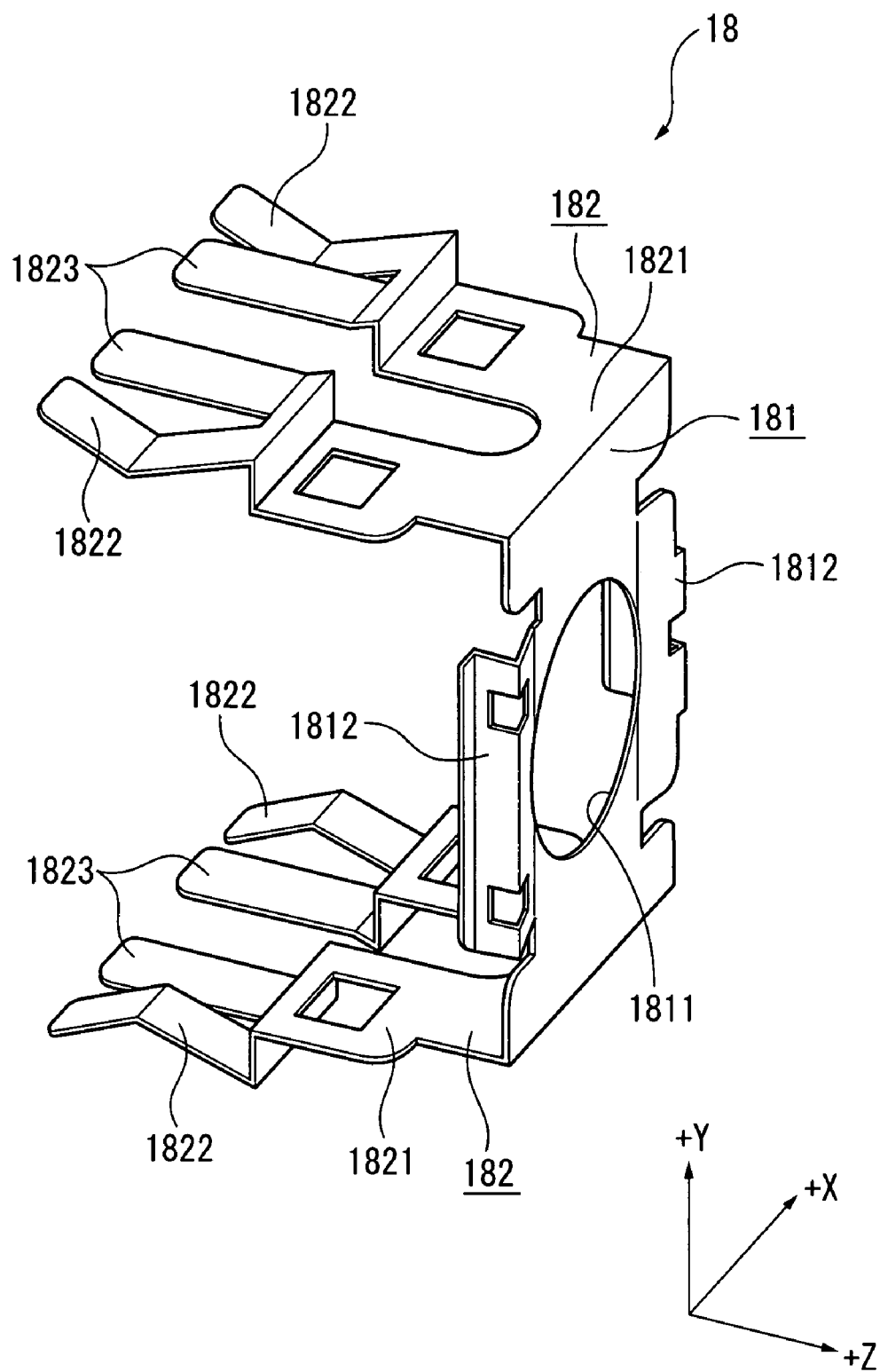
FIG. 13 is a perspective view briefly showing a biasing member of the aforesaid exemplary embodiment.

FIG. 13 is a perspective view briefly showing the biasing member 18.

As shown in FIG. 13, the biasing member 18 has a substantially C-shape in lateral view. When the biasing member 18 is attached to the lamp housing main body 15, the biasing member 18 biases and fixes the parallelizing concave lens 14 to the lamp housing main body 15 and biases and fixes the absorbers 17 to the lamp housing main body 15. The biasing member 18 may be formed of a heat-conductive material such as metal.

As shown in FIG. 13, a C-shape base portion 181 of the biasing member 18 has a substantially rectangular shape in plan view. The C-shape base portion 181 biases and fixes the parallelizing concave lens 14 to the lamp housing main body 15.

As shown in FIG. 13, a round opening 1811 is formed substantially at the center of the C-shape base portion 181. The opening 1811 has a smaller shape than a planar shape of the parallelizing concave lens 14.

As shown in FIG. 13, hook holders 1812 to be engaged with the hooks 1542 of the lamp housing main body 15 are provided on both ends in the X-axis direction of the C-shape base portion 181, the hook holders 1812 extending toward the light irradiation back side (the minus Z-axis direction side in FIG. 13). Specifically, when the hook holders 1812 are engaged with the hooks 1542, a circumferential portion of the opening 1811 abuts on a light irradiation front side surface of the parallelizing concave lens 14 and biases and fixes the parallelizing concave lens 14 to the light irradiation front side surface of the projection 1541 of the parallelizing concave lens supporting portion 154.

As shown in FIG. 13, C-shape end portions 181 of the biasing member 18 extend from ends in the vertical direction of the C-shape base portion 181 (ends in the Y-axis direction in FIG. 13) toward the light irradiation back side (the minus Z-axis direction side in FIG. 13). The C-shape end portions 182 biases and fixes the absorbers 17 to the lamp housing main body 15.

As shown in FIG. 13, the C-shape end portions 182 have a substantially common shape. Specifically, each C-shape end portion 182 includes an extending portion 1821 extending in a bifurcate manner toward the light irradiation back side (the minus Z-axis direction side in FIG. 13) and a biasing portion 1822 and a heat releasing portion 1823 which are bent from an end on the extending direction side of the extending portion 1821 and extend in a bifurcate manner toward the light irradiation back side.

The biasing portions 1822 (four biasing portions 1822 in the exemplary embodiment) are disposed at positions respectively corresponding to the openings 1525 of the lamp housing main body 15 when the biasing member 18 is attached to the lamp housing main body 15. As shown in FIG. 13, substantially at the middle of each biasing portion 1822 in the Z-axis direction, a recess is formed to be dented toward the inside of the C-shape of the biasing member 18, forming a substantially V-shape of the biasing portion 1822 in plan view. When the biasing member 18 is attached to the lamp housing main body 15, a valley portion of the V-shape biases the absorber 17 to the projection 1525A of the opening 1525.

As shown in FIG. 13, the heat releasing portions 1823 (four heat leasing portions in the exemplary embodiment) are near the biasing portions 1822 and have a substantially flat shape. When biasing portions 1822 bias the absorbers 17 to the lamp housing main body 15, the heat releasing portions 1823 release the heat conducted from the absorbers 17 via the biasing portions 1822.

Advantages that the above-described exemplary embodiment can provide include following advantages.

In the exemplary embodiment, since the light source device 10 is provided with the unused-light reflecting member 16, the unused light R3 outside the main reflecting mirror 12 of the light beams irradiated from the light source lamp 11 (the first focal position F3) is reflected by the unused-light reflecting surfaces 1621 and converged on the second focal positions F4 so as to be guided to the outside the lamp housing main body 15. Accordingly, unlike the related art, the unused light is not absorbed by the inner wall of the lamp housing or converted to heat, the temperature in the light source device 10 can be maintained low, suppressing deterioration of the lamp housing main body 15 or the light source lamp 11 and thereby stretching the longevity of the light source device 10.

Further, since the unused-light reflecting surfaces 1621 is the ellipsoidal surface, the unused light R3 can be reflected to be converged on the second focal positions F4, so that the unused light R3 can be guided to the outside of the lamp housing main body 15 with a simple arrangement.

Note that when the unused light R3 are reflected by the unused-light reflecting surfaces and converged on the second focal positions and if a portion of the unused light R3 reflected by the unused-light reflecting surfaces is irradiated on the light source lamp 11 or the main reflecting mirror 12, such irradiation of the portion of the unused light R3 causes an increase in temperature of the light source lamp 11 or the main reflecting mirror 12. Hence, it becomes difficult to maintain the temperature in the light source device 10 low.

In the exemplary embodiment, since the unused-light reflecting surfaces 1621 are set such that the light source lamp 11 and the main reflecting mirror 12 are not in the spaces defined by connecting the second focal positions F4 and the unused-light reflecting surfaces 1621, the unused light R3 reflected by the unused-light reflecting surfaces 1621 is not irradiated on the light source lamp 11 or the main reflecting mirror 12 but converged on the second focal positions F4. Accordingly, the temperature of the light source lamp 11 or the main reflecting mirror 12 is not raised due to such an irradiation of the portion of the unused light R3, thereby maintaining the temperature in the light source device 10 low.

Since the life of the light source device 10 can be increased, it is not necessary to change the light source lamp 11 or the lamp housing main body 15 in a short span of time, thereby reducing industrious wastes.

Since the temperature in the light source device 10 can be maintained low, the amount of air to be provided into the lamp housing main body 15 by the cooling fan of the cooling unit can be reduced. In other words, the rotation of the cooling fan can be slowed, thereby contributing to noise reduction of the projector 1. In addition, the voltage applied on the cooling fan can be set low, so that the rotation of the cooling fan can be slowed, thereby contributing to power saving of the projector 1.

Since the unused-light reflecting member 16 is provided independently from the lamp housing main body 15, the lamp housing main body 15 can be a simple shape compared with an arrangement in which the unused-light reflecting member is integrally formed on the inner wall of the lamp housing main body (i.e. the inner wall of the lamp housing main body 15 serves as the unused-light reflecting surface), thereby simplifying the manufacturing of the light source device 10.

Note that when the unused-light reflecting surface is provided to the light source device 10 as an independent single component, since the unused-light reflecting surface is the ellipsoidal surface, the unused-light reflecting member needs to be large for reflecting and guiding a large amount of the unused light R3 to the outside of the lamp housing main body 15.

However, since the four unused-light reflecting surfaces 1621 are provided in the exemplary embodiment, a large amount of unused light R3 can be reflected and guided to the outside of the lamp housing main body 15, thereby contributing to downsizing of the unused-light reflecting member 16.

When the unused-light reflecting surface is provided as an independent single component to the light source device 10, the unused-light reflecting surface needs to be extremely small to set the light source lamp 11 and the main reflecting mirror 12 outside the spaces defined by connecting the second focal positions and the unused-light reflecting surfaces. Hence, a large amount of the unused light cannot be reflected by the unused-light reflecting surfaces to be guided to the outside of the lamp housing main body 15.

In the exemplary embodiment, since the four unused-light reflecting surfaces 1621 are provided, the large amount of the unused light R3 reflected by the four unused-light reflecting surfaces 1621 can be converged on the second focal positions F4 without being irradiated on the light source lamp 11 or the main reflecting mirror 12 so that a large amount of the unused light R3 can be guided to the outside of the lamp housing main body 15. The unused-light reflecting member 16 can be formed in various shapes, thereby enhancing flexibility in design of the unused-light reflecting member 16.

Since the sub reflecting mirror 13 is provided to the light source device 10, the light beam radiated from the light source lamp 11 toward the opposite side of the main reflecting mirror 12 can be reflected by the sub reflecting mirror 13 to be incident on the reflecting surface 122A of the main reflecting mirror 12. Accordingly, an optical axis direction length and opening diameter of the main reflecting mirror 12 can be smaller compared with an arrangement in which no sub reflecting mirror 13 is provided. In other words, the light source device 10 or the projector 1 can be downsized without reducing the light use efficiency, thereby facilitating a layout of the light source device 10 in the projector 1.

As stated above, when the sub reflecting mirror 13 is provided, the optical axis direction length and the opening diameter of the main reflecting mirror 12 need to be small for downsizing the light source device 10, so that the amount of the unused light R3 passing through the sub reflecting mirror 13 becomes large. Hence, when the sub reflecting mirror 13 is provided to the light source device 10, the above-described advantages can be obtained more appropriately compared with, for example, an arrangement in which no unused-light reflecting member 16 is provided.

Since the absorbers 17 are provided to the light source device 10, the unused light R3 guided by the unused-light reflecting member 16 to the outside of the lamp housing main body 15 can be absorbed by the absorbers 17 and converted into heat. Hence, compared with, for example, an arrangement in which no absorber 17 is provided, leakage of stray light to the outside of the light source device 10 and irradiation of the unused light R3 on components outside the light source device 10 can be prevented, so that the projector 1 can be efficiently cooled by locally cooling on the absorbers 17.

The absorbers 17 are biased and fixed to the lamp housing main body 15 by the biasing member 18. The biasing member 18 includes the biasing portions 1822 and the heat releasing portions 1823 which are made of a heat conductive material. Hence, the heat conducted along a heat conduction path from the absorbers 17 via the biasing portions 1822 to the heat releasing portions 1823 can be released by the heat releasing portions 1823, thereby efficiently cooling the absorbers 17.

Since the biasing member 18 biases and fixes not only the absorbers 17 but also the parallelizing concave lens 14 to the lamp housing main body 15, the number of components in the light source device 10 can be reduced compared with, for example, an arrangement in which the absorbers 17 and the parallelizing concave lens 14 are biased by different biasing members to the lamp housing main body 15, thereby contributing to cost reduction and weight reduction.

In addition, since the biasing member 18 biases and fixes both of the absorbers 17 and the parallelizing concave lens 14 to the lamp housing main body 15, not only the heat releasing portions 1823 but the whole biasing member 18 can serve as the heat releasing portion. Hence, a heat releasing area for heat conducted from the absorbers 17 can be large, thereby effectively avoiding an increase in temperature of the light source device 10 which is caused by the heat generated by the absorbers 17.

The invention has been described using the exemplary embodiment, but the scope of the invention is not limited thereto and various improvements and changes in design can be made without deviating from the gist of the invention.

For example, in the above-described embodiment, the main reflecting mirror 12 is the ellipsoidal reflector, but the main reflecting mirror 12 may be a parabola reflector which reflects a light beam irradiated from the light source lamp 11 as a substantially parallel light beam. When the parabola reflector is employed as the main reflecting mirror, a light-transmissive substrate of anti-explosion glass and the like may be employed in place of the parallelizing concave lens 14. Thereby, similarly to the above-described embodiment, even if the light source lamp 11 is exploded, it is possible to prevent pieces thereof from scattering to the outside of the light source device 10.

In the exemplary embodiment, the unused-light reflecting member 16 is provided as a separate component from the lamp housing main body 15. However, the unused-light reflecting member may be integrally formed on the inner wall of the lamp housing main body. In other words, the inner wall of the lamp housing main body may serve as the unused-light reflecting surface. An arrangement may be employed, in which the lamp housing main body 15 is omitted and the light source device main body 10A and the parallelizing concave lens 14 are supported and fixed by the outer housing (10C). Another arrangement may be employed, in which the unused-light reflecting member is integrally provided on the inner wall of the outer housing (the inner wall of the outer housing serves as the unused-light reflecting surface). Another arrangement may be employed, in which the light source device main body 10A and the parallelizing concave lens 14 are supported and fixed by an exterior casing (2) and the unused-light reflecting member 16 is attached to the exterior casing, or the unused-light reflecting member is integrally formed on the inner wall of the exterior casing (the inner wall of the exterior casing serves as the unused-light reflecting surface) such that the unused light R3 can be guided to the outside of the exterior casing.

In the exemplary embodiment, two unused-light reflecting surfaces 1621 are provided to the unused-light reflecting member 16, but the number of the unused-light reflecting surface 1621 may be one, three or more than three. The positions of the unused-light reflecting members 16 are not limited to the disposition described in the exemplary embodiment (vertically facing positions). The unused-light reflecting members 16 may be disposed at other positions, for example, at horizontally facing positions.

In the exemplary embodiment, the unused-light reflecting surfaces 1621 are set such that the second focal positions F4 are outside the lamp housing main body 15, but another arrangement may be employed. For example, the second focal positions may be set inside the lamp housing main body 15 or at the openings 1525 of the lamp housing main body 15 as long as the unused light can be converged on the second focal positions and guided to the outside of the lamp housing main body 15.

In the exemplary embodiment, the unused-light reflecting surfaces 1621 are set such that the first focal positions F3 are positioned on the center position O of the arc image D, but another arrangement may be employed. For example, the unused-light reflecting surfaces 1621 may be set such that the first focal positions F3 are in the arc image D.

In the exemplary embodiment, the unused-light reflecting surfaces 1621 are the ellipsoidal surfaces, but another arrangement may be employed. For example, the unused-light reflecting surfaces 1621 may have any other shape as long as the unused light R3 is reflected and converged at a predetermined position to be guided to the outside of the light source device 10.

In the exemplary embodiment, the unused-light reflecting surfaces 1621 are the ellipsoidal surfaces, but another arrangement may be employed. For example, the unused-light reflecting surfaces 1621 may have any other shape as long as the unused light R3 is reflected and converged at a predetermined position to be guided to the outside of the light source device 10 and a portion of the unused light R3 is not irradiated on the light source lamp 11 or on the main reflecting mirror 12 when converging the unused light R3.

In the embodiment, the absorbers 17 are disposed in the openings 1525 of the lamp housing main body 15, but the positions of the absorbers 17 are not limited thereto. For example, the absorbers 17 may be disposed at the second focal positions F4 of the unused-light reflecting surfaces 1621 i.e. with a predetermined distance from the lamp housing main body 15. In this arrangement, it is possible to prevent the heat generated by the absorbers 17 from being conducted to the lamp housing main body 15, thereby maintaining the temperature in the light source device 10 low. Further, the shape of the absorbers 17 needs not be large, thereby contributing to downsizing of the absorbers 17.

In the exemplary embodiment, the light source device 10 includes the absorbers 17, but another arrangement may be employed. For example, the absorbers 17 may not be provided. Even when no absorbers 17 are provided, the unused light R3 reflected by the unused-light reflecting members 16 is irradiated in a diffused manner on a component outside the light source device 10 such as the inner wall of the exterior casing 2, so that influence on the component is small.

In the exemplary embodiment, the light source device 10 includes the sub reflecting mirror 13, but the arrangement is not limited thereto. For example, the sub reflecting mirror 13 may not be provided.

In the exemplary embodiment, only the projector 1 with the three liquid crystal panels 42R, 42G and 42B is taken as an example. However, the invention can be applied to a projector with only one liquid crystal panel, two liquid crystal panels or four or more liquid crystal panels, for example.

In the exemplary embodiment, the liquid crystal panels are a transmissive type separately provided with a light incident surface and a light irradiation surface. However, the liquid crystal panel may be a reflective type with a surface functioning as both of the light incident surface and the light beam irradiation surface.

In the exemplary embodiment, the optical modulator is the liquid crystal panels but may be a component other than liquid crystal such as a device using a micro mirror. In this arrangement, the polarization plates on the light beam incident side and the light beam irradiation side may be omitted.

In the exemplary embodiments, a front-type projector that projects an image in a direction for observing a screen is taken as an example, but an aspect of the invention is also applicable to a rear-type projector that projects an image in a direction opposite to the direction for observing the screen.

In the exemplary embodiment, the light source device according to the invention is employed for the projector, but another arrangement may be employed. For example, the light source device of the invention may be employed for any other optical apparatus.

The best arrangement implementing the invention and the like have been disclosed in the description above, the scope of the invention is not limited thereto. In other words, although the invention is illustrated and described while taking a certain exemplary embodiment as an example, a person in the art can modify the above-described arrangements in shapes, materials, numbers, quantity or any other details without departing from the technical spirit and an object of the invention.

Hence, in the above disclosure, any description limiting a shape, material or the like is given only for easy understanding of the invention but not intended to limit the scope of the invention. Therefore, the invention also includes description using a name of a component without a part of or all of the limitation on a shape, material or the like.

A light source device according to an aspect of the invention can have a longer life and may be utilized as a light source device for a projector used for a home theater system or presentation.

What is claimed is:

1. A light source device, comprising:
  a light source lamp that has a light emitting tube and a pair of electrodes, the light emitting tube including a discharge space, and the pair of electrodes being disposed in the discharge space of the light emitting tube;
  a reflector in a substantially C-shape in cross section that reflects a light beam irradiated from the light source lamp; and
  an unused-light reflecting member that is disposed on a light irradiation front side of the reflector and includes an unused-light reflecting surface, the unused-light reflecting surface reflecting unused light irradiated outside the reflector of the light beam irradiated from the light source lamp, the unused-light reflecting surface being an ellipsoidal surface that has a first focal position on a light emission center of the light source lamp and a second focal position onto which the ellipsoidal surface reflects and converges the unused light to guide the unused light to the outside of the light source device.

2. The light source device according to claim 1, wherein the light source lamp and the reflector are positioned so as not be in a space defined by connecting the second focal position and the unused-light reflecting surface.

3. The light source device according to claim 1, wherein the second focal position of the unused-light reflecting surface is positioned outside the light source device.

4. The light source device according to claim 1, further comprising:
  a supporting member that is disposed on the light irradiation front side of the reflector and supports the reflector, the supporting member attached with the unused-light reflecting member.

5. The light source device according to claim 1, wherein the unused-light reflecting surface includes a plurality of unused-light reflecting surfaces.

6. The light source device according to claim 1, further comprising:
  a sub reflecting mirror that has a reflecting surface disposed so as to face a reflecting surface of the reflector, the sub reflecting mirror reflecting a portion of the light beam irradiated from the light source lamp toward the discharge space.

7. The light source device according to claim 1, further comprising:
  an absorber that absorbs a light beam guided by the unused-light reflecting member to the outside of the light source device.

8. The light source device according to claim 7, further comprising:
  a supporting member that is disposed on the light irradiation front side of the reflector and supports the reflector, the supporting member attached with the absorber; and
  a biasing member that biases and fixes the absorber to the supporting member, the biasing member made of a heat conductive material, the biasing member having a biasing portion that biases and fixes the absorber to the supporting member and a heat releasing portion that releases heat conducted from the absorber to the outside.

9. A projector, comprising:
  a light source device, the light source device including: a light source lamp that has a light emitting tube and a pair of electrodes, the light emitting tube including a discharge space, the pair of electrodes being disposed in the discharge space of the light emitting tube; a reflector in a substantially C-shape in cross section that reflects a light beam irradiated from the light source lamp; an unused-light reflecting member that is disposed on a light irradiation front side of the reflector and includes an unused-light reflecting surface, the unused-light reflecting surface reflecting unused light outside the reflector of the light beam irradiated from the light source lamp, the unused-light reflecting surface being an ellipsoidal surface that has a first focal position on a light emission center of the light source lamp and a second focal position onto which the ellipsoidal surface reflects and converges the unused light to guide the unused light to the outside of the light source device;

an optical modulator that modulates a light beam irradiated from the light source device in accordance with image information; and a projection optical device that projects the light beam modulated by the optical modulator in an enlarged manner.

10. The light source device according to claim 9, wherein the light source lamp and the reflector are positioned so as not be in a space defined by connecting the second focal position and the unused-light reflecting surface.

11. The light source device according to claim 9, wherein the second focal position of the unused-light reflecting surface is positioned outside the light source device.

12. The light source device according to claim 9, further comprising:

a supporting member that is disposed on the light irradiation front side of the reflector and supports the reflector, the supporting member attached with the unused-light reflecting member.

13. The light source device according to claim 9, wherein the unused-light reflecting surface includes a plurality of unused-light reflecting surfaces.

14. The light source device according to claim 9, further comprising:

a sub reflecting mirror that has a reflecting surface disposed so as to face a reflecting surface of the reflector, the sub reflecting mirror reflecting a portion of the light beam irradiated from the light source lamp toward the discharge space.

15. The light source device according to claim 9, further comprising:

an absorber that absorbs a light beam guided by the unused-light reflecting member to the outside of the light source device.

16. The light source device according to claim 15, further comprising:

a supporting member that is disposed on the light irradiation front side of the reflector and supports the reflector, the supporting member attached with the absorber; and a biasing member that biases and fixes the absorber to the supporting member; the biasing member made of a heat conductive material, the biasing member having a biasing portion that biases and fixes the absorber to the supporting member and a heat releasing portion that releases heat conducted from the absorber to the outside.

* * * * *